US012732644B2

(12) United States Patent
Jia et al.

(10) Patent No.: US 12,732,644 B2
(45) Date of Patent: Sep. 8, 2026

(54) VIDEO STREAMING CONTROL BASED ON NETWORK CONDITIONS

(71) Applicant: Tencent Technology (Shenzhen) Company Limited, Shenzhen (CN)

(72) Inventors: Yuhang Jia, Shenzhen (CN); Yixue Lei, Shenzhen (CN); Yunfei Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 141 days.

(21) Appl. No.: 18/910,565

(22) Filed: Oct. 9, 2024

(65) Prior Publication Data

US 2025/0039473 A1 Jan. 30, 2025

Related U.S. Application Data

(63) Continuation of application No. PCT/CN2023/079511, filed on Mar. 3, 2023.

(30) Foreign Application Priority Data

Jun. 27, 2022 (CN) ........................ 202210739098.7

(51) Int. Cl.

| | |
|---|---|
| ***H04N 21/222*** | (2011.01) |
| ***H04N 21/2187*** | (2011.01) |
| ***H04N 21/466*** | (2011.01) |

(52) U.S. Cl.

CPC ..... *H04N 21/2223* (2013.01); *H04N 21/2187* (2013.01); *H04N 21/466* (2013.01)

(58) Field of Classification Search

CPC ........... H04N 21/2187; H04N 21/2223; H04N 21/466

See application file for complete search history.

(56) References Cited

U.S. PATENT DOCUMENTS

| | | | | |
|---|---|---|---|---|
| 2020/0364571 | A1* | 11/2020 | Xu | G06N 5/01 |
| 2021/0105517 | A1* | 4/2021 | Cho | H04N 21/64738 |
| 2021/0120296 | A1* | 4/2021 | Zhou | H04N 21/2407 |

FOREIGN PATENT DOCUMENTS

| | | |
|---|---|---|
| CN | 111107440 A | 5/2020 |
| CN | 111404713 A | 7/2020 |

(Continued)

OTHER PUBLICATIONS

Apr. 2, 2025—(EP) Search Report—App 23829457.3.
Jun. 3, 2023—(WO) Search Report—App PCT/CN2023/079511.

*Primary Examiner* — Nicholas T Corbo
(74) *Attorney, Agent, or Firm* — Banner & Witcoff, Ltd.

(57) ABSTRACT

A control method and apparatus for video stream transmission, a device, and a medium that can be applied to various scenarios is provided. The control method for video stream transmission may include: obtaining attribute data and network environment data that are in a process in which a video streaming server downloads a video stream; predicting, based on the attribute data and the network environment data, a network status in which the video streaming server downloads the video stream within a preset time period, to obtain a prediction result; and transmitting the prediction result to a streaming strategy adjuster. The prediction result is configured for instructing the streaming strategy adjuster to determine a streaming strategy corresponding to the video streaming server.

15 Claims, 11 Drawing Sheets

(56) References Cited

FOREIGN PATENT DOCUMENTS

| | | | |
|---|---|---|---|
| CN | 111669617 | A | 9/2020 |
| CN | 113518250 | A | 10/2021 |
| CN | 114040257 | A | 2/2022 |
| CN | 114449282 | A | 5/2022 |
| WO | 2021026509 | A1 | 2/2021 |

* cited by examiner

VIDEO STREAMING CONTROL BASED ON NETWORK CONDITIONS

RELATED APPLICATIONS

This application is a continuation of PCT Application No. PCT/CN2023/079511, filed Mar. 3, 2023, which claims priority to Chinese Patent Application No. 2022107390987, filed with the China National Intellectual Property Administration on Jun. 27, 2022 and entitled "CONTROL METHOD AND APPARATUS FOR VIDEO STREAM TRANSMISSION, DEVICE, AND MEDIUM", both of which are incorporated herein by reference in its entirety.

TECHNICAL FIELD

Aspects described herein relate to the field of communication technologies such as video stream transmission technology.

BACKGROUND

Currently, video stream transmission can be used in various scenarios such as smart transportation, assisted driving, cloud technology, and artificial intelligence. For example, in an assisted driving scenario, a collector can transmit a collected video stream related to vehicles on the road to a controller, so that the controller can perform corresponding logical processing based on the received video stream to implement assisted driving.

During the video stream transmission, a network usually changes, and network changes may affect the video stream transmission to a certain extent. Therefore, a manner for properly controlling the video stream transmission to be adapted to the network changes is an urgent problem that needs to be resolved.

BRIEF SUMMARY

Aspects provide a control method and apparatus for video stream transmission, a device, and medium that can enable video stream transmission to be adapted to network changes, so that the video stream transmission is properly controlled.

According to a first aspect, a control method for video stream transmission, performed by a predictor, is provided, the method including: obtaining attribute data and network environment data that are in a process in which a video streaming server downloads a video stream, the attribute data being configured for representing a download status of the video stream; predicting, based on the attribute data and the network environment data, a network status in which the video streaming server downloads the video stream within a preset time period, to obtain a prediction result; and transmitting the prediction result to a streaming strategy adjuster, the prediction result being configured for instructing the streaming strategy adjuster to determine a streaming strategy corresponding to the video streaming server.

According to a second aspect, a control method for video stream transmission, performed by a collector, is provided, the method including: receiving a prediction result transmitted by a predictor, the prediction result being obtained by the predictor predicting, based on attribute data and network environment data that are in a process in which a video streaming server downloads a video stream, a network status in which the video streaming server downloads the video stream within a preset time period, and the attribute data being configured for representing a download status of the video stream; and determining, based on the prediction result, a streaming strategy used when the video stream is transmitted to the video streaming server.

According to a third aspect, a control method for video stream transmission, performed by a video streaming server, is provided, the method including: collecting attribute data and network environment data that are in a process of downloading a video stream, the attribute data being configured for representing a download status of the video stream; transmitting the attribute data and the network environment data to a predictor, to enable the predictor to predict, based on the attribute data and the network environment data, a network status in which the video streaming server downloads the video stream within a preset time period, to obtain a prediction result; receiving a video stream pull request transmitted by a controller, the video stream pull request being generated by the controller based on the prediction result obtained from the predictor; and determining, based on the video stream pull request, a streaming strategy used when the video stream is transmitted to the controller.

According to a fourth aspect, a control apparatus for video stream transmission is provided, the apparatus being deployed on a predictor, the apparatus including: an obtaining module, configured to obtain attribute data and network environment data that are in a process in which a video streaming server downloads a video stream, the attribute data being configured for representing a download status of the video stream; a prediction module, configured to predict, based on the attribute data and the network environment data, a network status in which the video streaming server downloads the video stream within a preset time period, to obtain a prediction result; and a transmission module, configured to transmit the prediction result to a streaming strategy adjuster, the prediction result being configured for instructing the streaming strategy adjuster to determine a streaming strategy corresponding to the video streaming server.

According to a fifth aspect, a control apparatus for video stream transmission is provided, the apparatus being deployed on a collector, the apparatus including: a receiving module, configured to receive a prediction result transmitted by a predictor, the prediction result being obtained by the predictor predicting, based on attribute data and network environment data that are in a process in which a video streaming server downloads a video stream, a network status in which the video streaming server downloads the video stream within a preset time period, and the attribute data being configured for representing a download status of the video stream; and an adjustment module, configured to determine, based on the prediction result, a streaming strategy used when the video stream is transmitted to the video streaming server.

According to a sixth aspect, a control apparatus for video stream transmission is provided, the apparatus being deployed on a video streaming server, the apparatus including: a collection module, configured to collect attribute data and network environment data that are in a process of downloading a video stream, the attribute data being configured for representing a download status of the video stream; a transmission module, configured to transmit the attribute data and the network environment data to a predictor, to enable the predictor to predict, based on the attribute data and the network environment data, a network status in which the video streaming server downloads the video stream within a preset time period, to obtain a prediction result; a receiving module, configured to receive a video stream pull request transmitted by a controller, the video stream pull request being generated by the controller based on the prediction result obtained from the predictor; and an adjustment module, configured to determine, based on the video stream pull request, a streaming strategy used when the video stream is transmitted to the controller.

According to a seventh aspect, an electronic device is provided, the electronic device including one or more processors; and a memory, configured to store one or more programs, the one or more programs, when executed by the one or more processors, enabling the electronic device to implement the foregoing control method for video stream transmission.

According to an eighth aspect, a computer-readable medium is provided. The computer-readable medium has a computer program stored thereon, the computer program, when executed by a processor, implementing the foregoing control method for video stream transmission.

According to a ninth aspect, a computer program product, including computer instructions, is provided. The computer instructions, when executed by a processor, implements the foregoing control method for video stream transmission.

DETAILED DESCRIPTION

Currently, during video stream transmission, a network usually changes, and network changes may affect the video stream transmission to a certain extent. In the related art, there is no clear solution on how to properly control the video stream transmission to be adapted to the network changes.

Figures 1, 2:
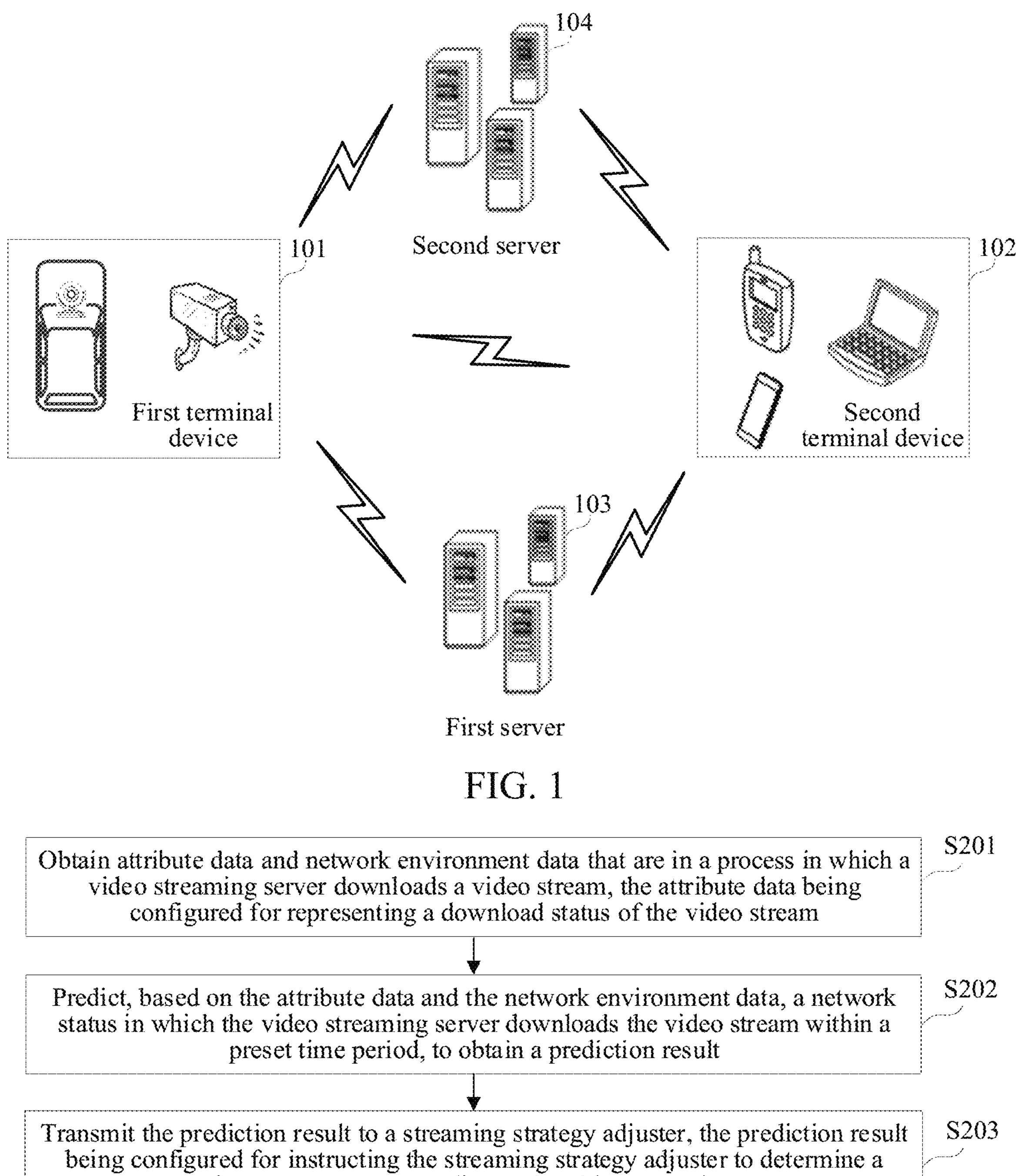
FIG. 1 is a schematic diagram of an example implementation environment in which one or more aspects described herein can be applied.
FIG. 2 is a flowchart of an example control method for video stream transmission according to one or more aspects described herein.

FIG. 1 is a schematic diagram of an example implementation environment in which one or more aspects described herein can be applied. The implementation environment includes a first terminal device 101, a second terminal device 102, a first server 103, and a second server 104. The first terminal device 101, the second terminal device 102, the first server 103, and the second server 104 can communicate with each other via wired or wireless networks. The first terminal device 101 and the second terminal device 102 can upload own data to the first server 103 or the second server 104. In addition, the first terminal device 101 and the second terminal device 102 can obtain data from the first server 103 and the second server 104.

The first terminal device 101 and the second terminal device 102 may include but are not limited to a mobile phone, a tablet, a laptop, a smart voice interaction device, a smart home appliance, an on-board terminal, an aerial vehicle, and the like.

The first server 103 and the second server 104 may be servers that provide various services, and may be independent physical servers, or server clusters or distributed systems including a plurality of physical servers, or cloud servers providing a cloud service, a cloud database, cloud computing, a cloud function, cloud storage, a network service, a cloud communication, a middleware service, a domain name service, a security service, a content delivery network (CDN), and a big data and artificial intelligence platform, and the like. The servers 103 and 104 may be other servers and are not limited to these examples.

A quantity of the first terminal device 101, the second terminal device 102, the first server 103, and the second server 104 in FIG. 1 is only schematic. According to actual needs, the implementation environment can have any quantity of terminal devices and servers.

According to one or more aspects, a control method for video stream transmission may be performed by the first server 103, and the first server 103 may serve as a predictor in this case.

For example, the predictor may obtain attribute data and network environment data that are in a process in which a video streaming server downloads a video stream. The attribute data may be configured for representing a download status of the video stream. Then, a network status in which the video streaming server downloads the video stream within a preset time period may be predicted based on the attribute data and the network environment data, to obtain a prediction result. Then, the prediction result may be transmitted to a streaming strategy adjuster. The prediction result may be configured for instructing the streaming strategy adjuster to determine a streaming strategy corresponding to the video streaming server. In one example, the streaming strategy adjuster may include, but is not limited to, a collector, a controller, or the like.

According to other aspects, the control method for video stream transmission may be performed by the first terminal device 101, and the first terminal device 101 may serve as a collector in this case.

For example, the collector may collect a video stream corresponding to a road image and transmit the collected video stream to the video streaming server; and receive a prediction result transmitted by the predictor. The prediction result may be obtained by the predictor predicting, based on attribute data and network environment data that are in a process in which a video streaming server downloads a video stream, a network status in which the video streaming server downloads the video stream within a preset time period, and the attribute data may be configured for representing a download status of the video stream. Then a streaming strategy used when the video stream is transmitted to the video streaming server may be determined based on the prediction result.

In one example, the control method for video stream transmission may be performed by the second server 104, and the second server 104 may be specifically a video streaming server in this case.

For example, the video streaming server may collect attribute data and network environment data that are in a process in which the video streaming server downloads a video stream. The attribute data may be configured for representing a download status of the video stream. Then, the attribute data and the network environment data may be transmitted to a predictor, to enable the predictor to predict, based on the attribute data and the network environment data, a network status in which the video streaming server downloads the video stream within a preset time period, to obtain a prediction result. A video stream pull request transmitted by a controller may be received. The video stream pull request may be generated by the controller based on the prediction result obtained from the predictor. Then a streaming strategy used when the video stream is transmitted to the controller may be determined based on the video stream pull request.

In one or more arrangements, the control method for video stream transmission may be performed by the second terminal device 102, and the second terminal device 102 may serve as a controller in this case.

For example, a controller may receive a prediction result transmitted by a predictor, and generate a video stream pull request based on the prediction result. Then, the controller may transmit a video stream pull request to a video streaming server. The video stream pull request may be configured for instructing the video streaming server to determine, based on the video stream pull request, a streaming strategy used when the video stream is transmitted to the controller.

For example, the technical solutions of the implementation shown in FIG. 1 can be applied to various scenarios, including but not limited to smart transportation, assisted driving, cloud technology, artificial intelligence, and the like. Adjustments can be correspondingly made according to specific application scenarios.

For example, if the technical solutions are applied to a scenario such as smart transportation or assisted driving, the first terminal device 101 may be an on-board terminal, a navigation terminal, and the like. The second terminal device 102 may be a computer, a smart phone, a tablet, a laptop, and the like. For example, the on-board terminal can collect a video stream corresponding to a road image, stream the collected video stream to a video streaming server, receive a prediction result transmitted by a predictor, and determine, based on the prediction result, a streaming strategy used when the video stream is transmitted to the video streaming server. A computer can receive the prediction result transmitted by the predictor, and generate a video stream pull request based on the prediction result. Then, the computer may transmit the video stream pull request to the video streaming server. The video stream pull request may be configured for instructing the video streaming server to determine, based on the video stream pull request, a streaming strategy used when the video stream is transmitted to the computer.

If the technical solutions are applied to a scenario such as cloud technology or artificial intelligence, at least one of the first server 103 and the second server 104 may be a server located in the cloud, and at least one of the first terminal device 101 and the second terminal device 102 can use computing power of the cloud to provide a cloud services, and the like. For example, the cloud server may predict, based on obtained attribute data and network environment data that are in a process in which a video streaming server downloads a video stream, a network status in which the video streaming server downloads the video stream within a preset time period, to obtain a prediction result, and transmit the prediction result to a streaming strategy adjuster. The prediction result may be configured for instructing the streaming strategy adjuster to determine a streaming strategy corresponding to the video streaming server. The cloud server may also collect the attribute data and network environment data that are in the process of downloading the video stream, and then transmit the attribute data and network environment data to the predictor, and adjust, in response to the video stream pull request transmitted by a controller and based on the video stream pull request, the streaming strategy used when the video stream is transmitted to the controller.

According to one or more aspects, data related to an object, such as the attribute data and the network environment data, may be involved. For specific products or technologies, permissions or consent of the object may be required. Collection, use, and processing of relevant data may be required to comply with relevant laws, regulations, and standards of relevant countries and regions.

Various implementation details are described in detail in the following.

FIG. 2 is a flowchart of an example control method for video stream transmission. The control method for video stream transmission may be performed by the first server 103 as the predictor. As shown in FIG. 2, the control method for video stream transmission includes at least S201 to S203, and details are as follows:

S201: Obtain attribute data and network environment data that are in a process in which a video streaming server downloads a video stream. The attribute data may be configured for representing a download status of the video stream.

In some examples, the attribute data may refer to data related to the download status of the video stream.

During the video stream transmission, the video stream may be divided into one or more (two or more) segments. Therefore, the attribute data may include, but is not limited to, a download rate, download code rate, download sampling rate, download bit rate, and the like of a downloaded video stream segment, download duration of the downloaded video stream segment, and a quantity of remaining undownloaded video stream segments, and the like. The attribute data may alternatively be any other data related to the download status of the video stream, and is not limited to the above examples.

The attribute data may be generated at an application layer in a network structure (such as a seven-layer network structure). Therefore, attribute data can be obtained from the application layer.

In one or more arrangements, the network environment data may refer to data related to a network environment in which a video stream is downloaded.

In one or more examples, the network environment data may include, but is not limited to, signal to interference plus noise ratio (SINR), received signal strength indicator (RSSI), reference signal receiving quality (RSRP), reference signal receiving power (RSRQ), delay, throughput, packet loss rate, and the like. Network environment data may alternatively be any other data related to the network environment in which the video stream is located. The network environment data is not limited to these examples.

Network environment data may be generated at a network layer in a network structure (such as a seven-layer network structure). Therefore, network environment data can be obtained from the network layer.

In one or more arrangements, the predictor can also obtain location data. The location data may refer to data related to a location of a streaming strategy adjuster. In one example, the location data may include but is not limited to azimuth, latitude and longitude, and the like. Location data can alternatively be any other data related to the location of the streaming strategy adjuster. Location data is not limited to these examples.

Location data may be generated at an application layer in a network structure (such as a seven-layer network structure). Therefore, location data can be obtained from the application layer.

S202: Predict, based on the attribute data and the network environment data, a network status in which the video streaming server downloads the video stream within a preset time period, to obtain a prediction result.

In one or more arrangements, after the attribute data and the network environment data that are in the process in which the video streaming server downloads the video stream are obtained from the predictor, the network status in which the video streaming server downloads the video stream within the preset time period may be predicted based on the attribute data and the network environment data, to obtain the prediction result.

According to some aspects, the preset time period may refer to a time period after the current moment based on the current moment. In other words, the preset time period may be a time period in the future. For example, assuming that the current time is 05:00:00 pm on Jun. 24, 2022, a 24 hour period from 05:00:00 pm on Jun. 24, 2022 ending at 05:00:00 pm to Jun. 25, 2022 may be preset, and the network status in which the video streaming server downloads the video stream may be predicted. In some examples, the preset time period can be arbitrary. For example, following the current time in the foregoing example, a one hour time period beginning from 07:00:00 pm on Jun. 24, 2022 and ending at 08:00:00 pm on Jun. 24, 2022 may be used, and the network status in which the video streaming server downloads the video stream may be predicted.

According to one or more aspects, the predictor can predict, based on the attribute data, the network environment data, and location information, the network status in which the video streaming server downloads the video stream within the preset time period, to obtain the prediction result.

S203: Transmit the prediction result to a streaming strategy adjuster. The prediction result may be configured for instructing the streaming strategy adjuster to determine a streaming strategy corresponding to the video streaming server.

According to one or more aspects, the predictor may predict, based on the attribute data and the network environment data, the network status in which the video streaming server downloads the video stream within a preset time period, to obtain the prediction result. Then the prediction result can be transmitted to the streaming strategy adjuster. In this way, the streaming strategy adjuster can determine, based on the prediction result, the streaming strategy corresponding to the video streaming server. For a process in which the streaming strategy adjuster determines, based on the prediction result, the streaming strategy corresponding to the video streaming server, detailed description is provided below.

In one or more arrangements, the predictor may predict, based on the obtained attribute data and the network environment data that are in the process in which the video streaming server downloads the video stream, the network status in which the video streaming server downloads the video stream within a preset time period. In addition, the predictor may transmit the obtained prediction result to the streaming strategy adjuster, and the streaming strategy adjuster can determine, based on the prediction result, a streaming strategy corresponding to the video streaming server. Because the prediction result may be determined based on the attribute data and the network environment data that are in the process in which the video streaming server downloads the video stream, the prediction result can more accurately reflect a network status of the video streaming server in a future preset time period. Correspondingly, the streaming strategy adjuster may determine the streaming strategy based on the prediction result, which ensures that the determined streaming strategy may be adapted to the network status in the future preset time period, and a video stream may be transmitted to the video streaming server based on the streaming strategy. This can better adapt the video stream transmission to future network changes, thereby properly controlling the video stream transmission. In addition, because the attribute data may include the data related to the download status of the video stream, the network environment data may include the data related to the network environment in which the video stream is downloaded, and these two types of data may be great indicators for predicting a network status, the network status in which the video streaming server downloads the video stream within the preset time period is jointly predicted based on the two types of data to improve the accuracy of the prediction result, thereby further improving accuracy of the streaming strategy corresponding to the video streaming server determined by the streaming strategy adjuster based on the prediction result.

Figures 3, 4:
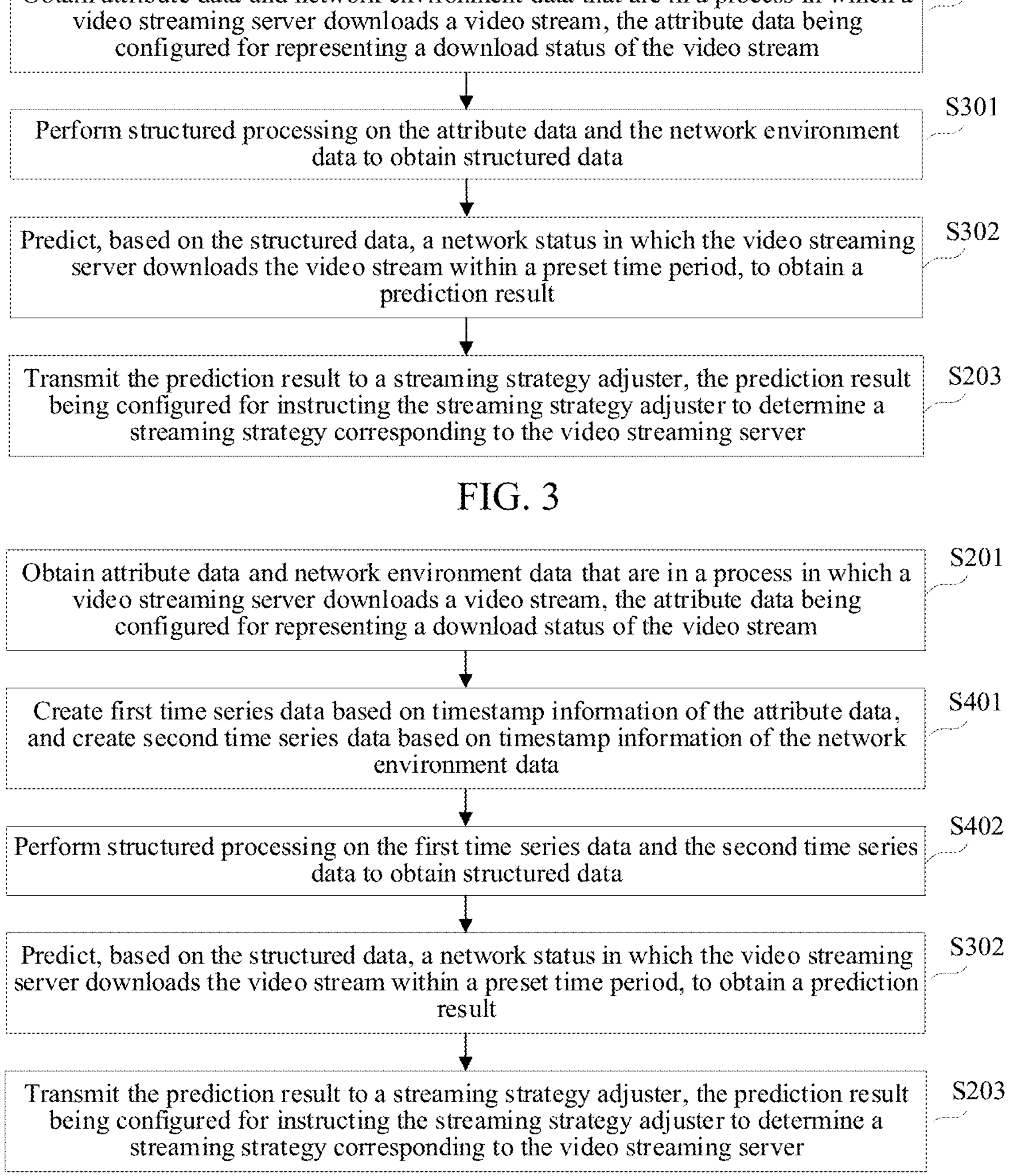
FIG. 3 is a flowchart of another example control method for video stream transmission according to one or more aspects described herein.
FIG. 4 is a flowchart of another example control method for video stream transmission according to one or more aspects described herein.

Another example control method for video stream transmission is provided, and the control method for video stream transmission may be performed by the first server 103 as the predictor. As shown in FIG. 3, the control method for video stream transmission may include S201, S301 and S302, and S203.

S301 and S302 are described in detail as follows:

S301: Perform structured processing on the attribute data and the network environment data to obtain structured data.

After the predictor obtains the attribute data and network environment data, the structured processing might need to be performed on the attribute data and network environment data to obtain the structured data.

Structured processing may refer to converting unstructured data or semi-structured data into structured data. The unstructured data may include data with an irregular or incomplete data structure, data without a predefined data model, and data that is inconvenient to be represented by a two-dimensional logical table in a database. Specifically, the unstructured data may include all formats of official files, text, pictures, XML, HTML, various reports, images, audio, video, and the like. Correspondingly, the structured data may include data of which a data structure is regular or complete, with a predefined data model, and can be easily represented by a two-dimensional logical table in a database. The semi-structured data may be between the unstructured data and the structured data. For example, part of the semi-structured data may be similar to the unstructured data and part of the semi-structured data may be similar to the structured data. Therefore, structured processing might need to be performed on the semi-structured data to obtain structured data.

In one or more arrangements, the process of performing structured processing on the attribute data and the network environment data to obtain structured data in S301 may include at least:

- performing structured processing on the attribute data and network environment data based on a preset structured rule, to obtain the structured data. The preset structured rule can be set by users.

For example, assuming that the attribute data includes "download duration for a segment 1 of a video stream A is 10 seconds", and assuming that the preset structured rule includes "video stream name: xxx; video stream segment number: xxx; download duration: xxx;", then structured processing may be performed on the attribute data "the download duration for the segment 1 of the video stream A is 10 seconds", to obtain corresponding structured data as "video stream name: A; video stream segment number: 1; download duration: 10 seconds".

In another example, assuming that the network environment data includes "a packet loss rate for the segment 1 of the video stream A is 30%", and assuming that the preset structured rule includes "video stream name: xxx; video stream segment number: xxx; packet loss rate: xxx;", then structured processing may be performed on the network environment data "the download duration for the segment 1 of the video stream A is 30%", to obtain corresponding structured data as "video stream name: A; video stream segment number: 1; packet loss rate: 30%".

According to one or more aspects, the structured processing can be implemented using methods including, but not limited to, a decision tree, deep learning, structured data cleaning, or the like. Adjustments can be flexibly made according to specific application scenarios.

S302: Predict, based on the structured data, the network status in which the video streaming server downloads the video stream within the preset time period, to obtain the prediction result.

In one or more examples, the predictor may perform structured processing on the attribute data and network environment data. After obtaining the structured data, the predictor can, based on the structured data, predict the network status in which the video streaming server downloads the video stream within the preset time period, to obtain the prediction result.

Details of S201 and S203 shown in FIG. 3 are substantially similar to those of S201 and S203 of FIG. 2. Accordingly, those details are not repeated here.

According to some aspects, the predictor may first perform structured processing on the attribute data and network environment data, and then predict, based on the structured data after structured processing, the network status in which the video streaming server downloads the video stream within the preset time period. Because structured data may be more concise and standard than original attribute data and network environment data, and other data irrelevant to a network status prediction can be removed during the structured processing, the network status can be predicted more quickly and easily based on the structured data, to obtain the prediction result. In addition, interference by irrelevant data can be avoided to improve accuracy of the prediction result.

According to one or more other aspects, another example control method for video stream transmission is provided, and the control method for video stream transmission may be performed by the first server 103 as the predictor. As shown in FIG. 4, the control method for video stream transmission may include S201, S401 and S402, S302, and S203.

S401 and S402 are described in detail as follows:

S401: Create first time series data based on timestamp information of the attribute data, and create second time series data based on timestamp information of the network environment data.

In one example, after the predictor obtains the attribute data and network environment data, the first time series data may be created based on the timestamp information of the attribute data, and the second time series data may be created based on the timestamp information of the network environment data.

According to one or more aspects, time series data (that is, the first time series data and the second time series data) may refer to data with a time axis.

In one or more examples, the attribute data may include a plurality of types of first data. The process of creating first time series data based on timestamp information of the attribute data in S401 may include at least:

- obtaining timestamp information corresponding to the plurality of types of first data; and
- creating, for the plurality of types, based on the timestamp information corresponding to the plurality of types of first data, first time series data corresponding to the plurality of types.

Accordingly, after the predictor obtains the timestamp information corresponding to the plurality of types of first data, the first time series data corresponding to the plurality of types of first data may be optionally created based on the timestamp information corresponding to the plurality of types of first data.

The timestamp information corresponding to the first data may refer to the time when the first data is generated.

For example, the attribute data may include three types of first data: type N1, type N2, and type N3. Then, timestamp information corresponding to k1 first data of type N1, timestamp information corresponding to k2 first data of type N2, and timestamp information corresponding to k3 first data of type N3 can be obtained, where k1 is greater than or equal to 1, k2 is greater than or equal to 1, k3 is greater than or equal to 1, and k1, k2, k3 are all integers, which may or may not be the same. Next, first time series data for type N1 may be created based on the timestamp information corresponding to the k1 first data of type N1, first time series data for type N2 may be created based on the timestamp information corresponding to the k2 first data of type N2, and first time series data for type N3 may be created based on the timestamp information corresponding to the k3 first data of type N3.

In one or more arrangements, the network environment data may include a plurality of types of second data. The process of creating second time series data based on timestamp information of the network environment data in S401 may include at least:

obtaining timestamp information corresponding to the plurality of types of second data; and creating, for the plurality of types, based on the timestamp information corresponding to the plurality of types of second data, second time series data corresponding to the plurality of types.

Accordingly, after the predictor obtains the timestamp information corresponding to the plurality of types of second data, the second time series data corresponding to the plurality of types of second data may be optionally created based on the timestamp information corresponding to the plurality of types of second data.

The timestamp information corresponding to the second data may refer to the time when the second data is generated.

For example, the network environment data may include three types of second data: type M1, type M2, and type M3. Then, timestamp information corresponding to k1 second data of type M1, timestamp information corresponding to k2 second data of type M2, and timestamp information corresponding to k3 second data of type M3 can be obtained, where k1 is greater than or equal to 1, k2 is greater than or equal to 1, k3 is greater than or equal to 1, and k1, k2, k3 are all integers, which may or may not be the same. Next, second time series data for type M1 may be created based on the timestamp information corresponding to the k1 second data of type M1, second time series data for type M2 may be created based on the timestamp information corresponding to the k2 second data of type M2, and second time series data for type M3 may be created based on the timestamp information corresponding to the k3 second data of type M3.

S402: Perform structured processing on the first time series data and the second time series data to obtain the structured data.

After the predictor creates the first time series data based on the timestamp information of the attribute data, and creates the second time series data based on the timestamp information of the network environment data, the structured processing may be performed on the first time series data and the second time series data, to obtain the structured data.

The process of performing structured processing on the first time series data and the second time series data to obtain the structured data in S402 may include at least:

preprocessing the first time series data and the second time series data to obtain preprocessed first time series data and preprocessed second time series data; and performing structured processing on the preprocessed first time series data and the preprocessed second time series data based on a preset structure network, to obtain the structured data.

Accordingly, the predictor may optionally first preprocess the first time series data and the second time series data to obtain the preprocessed first time series data and the preprocessed second time series data, and then, structured processing may be performed on the preprocessed first time series data and the preprocessed second time series data based on the preset structural network, to obtain the structured data.

The preprocessing includes, but is not limited to, abnormal data removal processing and duplicate data removal processing. In one or more arrangements, the preprocessing may include any one or more of abnormal data removal processing and duplicate data removal processing.

The preset structure network can be set by users, and the preset structure network can include various preset structured rules mentioned in the above description. In addition, the preset structure network can also include associations between different preset structured rules, and the like. The preset structure network can be flexibly adjusted according to actual needs.

In this way, by implementing optional aspects, abnormal data or duplicate data in the first time series data and the second time series data can be removed, so that accuracy of the obtained first time series data and the second time series data may be further ensured, thereby obtaining more accurate structured data and data with low redundancy.

The details of S302 shown in FIG. 4 are substantially similar to the details of S302 shown in FIG. 3. The details of S201 and S203 shown in FIG. 4 are substantially similar to the details S201 and S203 of FIG. 2. Accordingly, the substantially similar details are not repeated here.

According to one or more aspects, after the predictor creates the first time series data based on the timestamp information of the attribute data and creates the second time series data based on the timestamp information of the network environment data, the structured processing may be performed on the first time series data and the second time series data. Because the data may include time characteristics, more accurate structured data can be obtained, and a prediction based on this structured data may be more accurate.

Figures 5, 6:
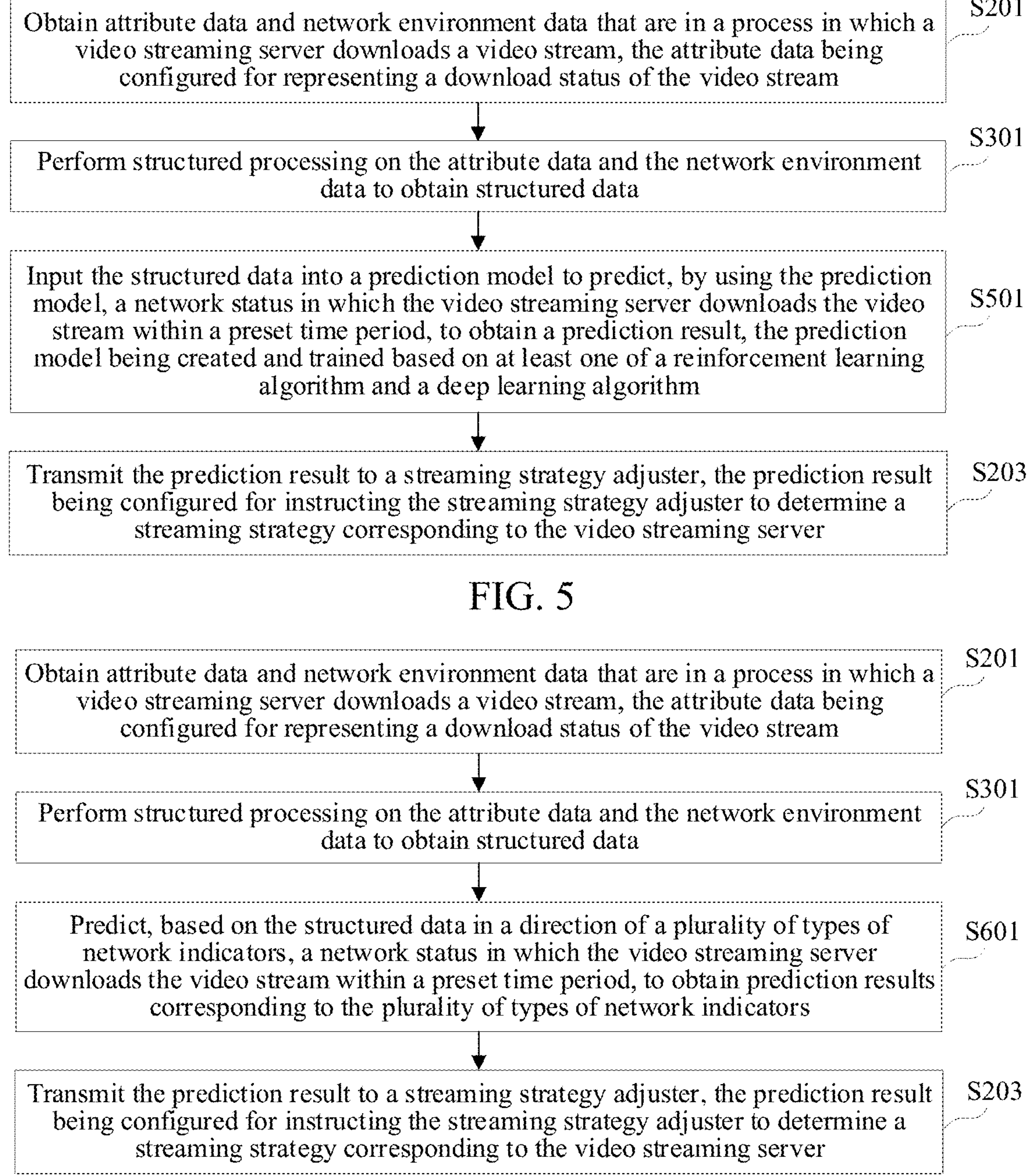
FIG. 5 is a flowchart of another example control method for video stream transmission according to one or more aspects described herein.
FIG. 6 is a flowchart of another example control method for video stream transmission according to one or more aspects described herein.

According to one or more other aspects, another example control method for video stream transmission is provided, and the control method for video stream transmission may be performed by the first server 103 as the predictor. As shown in FIG. 5, the control method for video stream transmission may include S201, S301, S501, and S203.

S501 is described in detail as follows:

S501: Input the structured data into a prediction model to predict, by using the prediction model, the network status in which the video streaming server downloads the video stream within the preset time period, to obtain the prediction result. The prediction model may be built and trained based on at least one of a reinforcement learning algorithm and a deep learning algorithm.

The predictor can build and train the prediction model based on at least one of the reinforcement learning algorithm and the deep learning algorithm, and then input the structured data into the prediction model to predict, by using the prediction model, the network status in which the video streaming server downloads the video stream within the preset time period, to obtain the prediction result.

The reinforcement learning algorithm may include, but is not limited to, a neural network-based deep q-learning (DQN) algorithm, a deep deterministic policy gradient (DDPG) algorithm that is resolved on continuous action space, and a tabular state-action-reward-state'-action' (Sarsa) algorithm and a Q-Learning algorithm, a policy-gradient algorithm of policy ladder, and the like.

The deep learning algorithm may include, but is not limited to, a feedforward neural network (FNN) algorithm, a convolutional neural network (CNN) algorithm, a recurrent neural network (RNN) algorithm, a generative adversarial network (GAN) algorithm, a graph neural network algorithm, a recursive neural network algorithm, a back-propagation algorithm, and the like. The most common RNN algorithm is a long short-term memory (LSTM) algorithm.

In one or more arrangements, the prediction model can be created and trained based on the DQN-LSTM algorithm. In one example, the DQN-LSTM algorithm can also use pensieve as a basic framework. The pensieve is an adaptation video streaming algorithm that learns a streaming strategy without enhancement based on an a3c network, and one of the main features of the algorithm may be a combination of a traditional rate-based code rate adaptation scheme and a buffer-based code rate adaptation scheme.

The details of S301 shown in FIG. 5 are substantially similar to the details of S301 shown in FIG. 3. The details of S201 and S203 shown in FIG. 5 are substantially similar to the details of S201 and S203 shown in FIG. 2. Accordingly, these details are not repeated here.

According to one or more aspects, the predictor may create and train the prediction model, and use the prediction model to predict the network status in which the video streaming server downloads the video stream within the preset time period. Because the trained prediction model usually has high work efficiency and high prediction accuracy, the prediction can be quickly and easily made to obtain the prediction result. This may be suitable for wider scenarios, such as smart transportation and assisted driving with high security requirements, or livestreaming that require high real-time performance.

According to one or more further aspects, another example control method for video stream transmission is provided, and the control method for video stream transmission may be performed by the first server 103 as the predictor. As shown in FIG. 6, the control method for video stream transmission may include S201, S301, S601, and S203.

S601 is described in detail as follows:

S601: Predict, based on the structured data in a direction of a plurality of types of network indicators, the network status in which the video streaming server downloads the video stream within the preset time period, to obtain prediction results corresponding to the plurality of types of network indicators.

The predictor can predict, based on the structured data in the direction of the plurality of types of network indicators, the network status in which the video streaming server downloads the video stream within the preset time period, to obtain the prediction results corresponding to the plurality of types of network indicators.

The network indicators may refer to indicators that can reflect quality of a network. In one or more arrangements, the network indicators include, but are not limited to, a SINR indicator, an RSSI indicator, an RSRP indicator, an RSRQ indicator, a delay indicator, a throughput indicator, a packet loss rate indicator, a code rate indicator, a rate indicator, and the like. Each network indicator may be referred to as a type of network indicator.

The plurality of types of network indicator include a code rate indicator type, a delay indicator type, and a throughput indicator type. The process of predicting, based on the structured data in a direction of a plurality of types of network indicators, the network status in which the video streaming server downloads the video stream within the preset time period, to obtain prediction results corresponding to the plurality of types of network indicators in S601 may include at least:

predicting, based on the structured data in a direction of the code rate indicator type, the network status in which the video streaming server downloads the video stream within the preset time period, to obtain a prediction result corresponding to the code rate indicator type;

predicting, based on the structured data in a direction of the delay indicator type, the network status in which the video streaming server downloads the video stream within the preset time period, to obtain a prediction result corresponding to the delay indicator type; and predicting, based on the structured data in a direction of the throughput indicator type, the network status in which the video streaming server downloads the video stream within the preset time period, to obtain a prediction result corresponding to the throughput indicator type.

The details of S301 shown in FIG. 6 are substantially similar to the details of S301 shown in FIG. 3. The details of S201 and S203 shown in FIG. 6 are substantially similar to the details of S201 and S203 shown in FIG. 2. These details are not described again here.

According to one or more aspects, the predictor may predict from the direction of the plurality of types of network indicators to obtain the prediction results corresponding to the plurality of types of network indicators. In this way, the prediction may be more comprehensive, and the streaming strategy adjuster can more accurately determine, based on the prediction results corresponding to the plurality of types of network indicators, the streaming strategy corresponding to the video streaming server, so that accuracy of adjustments may be higher.

Figures 7, 8:
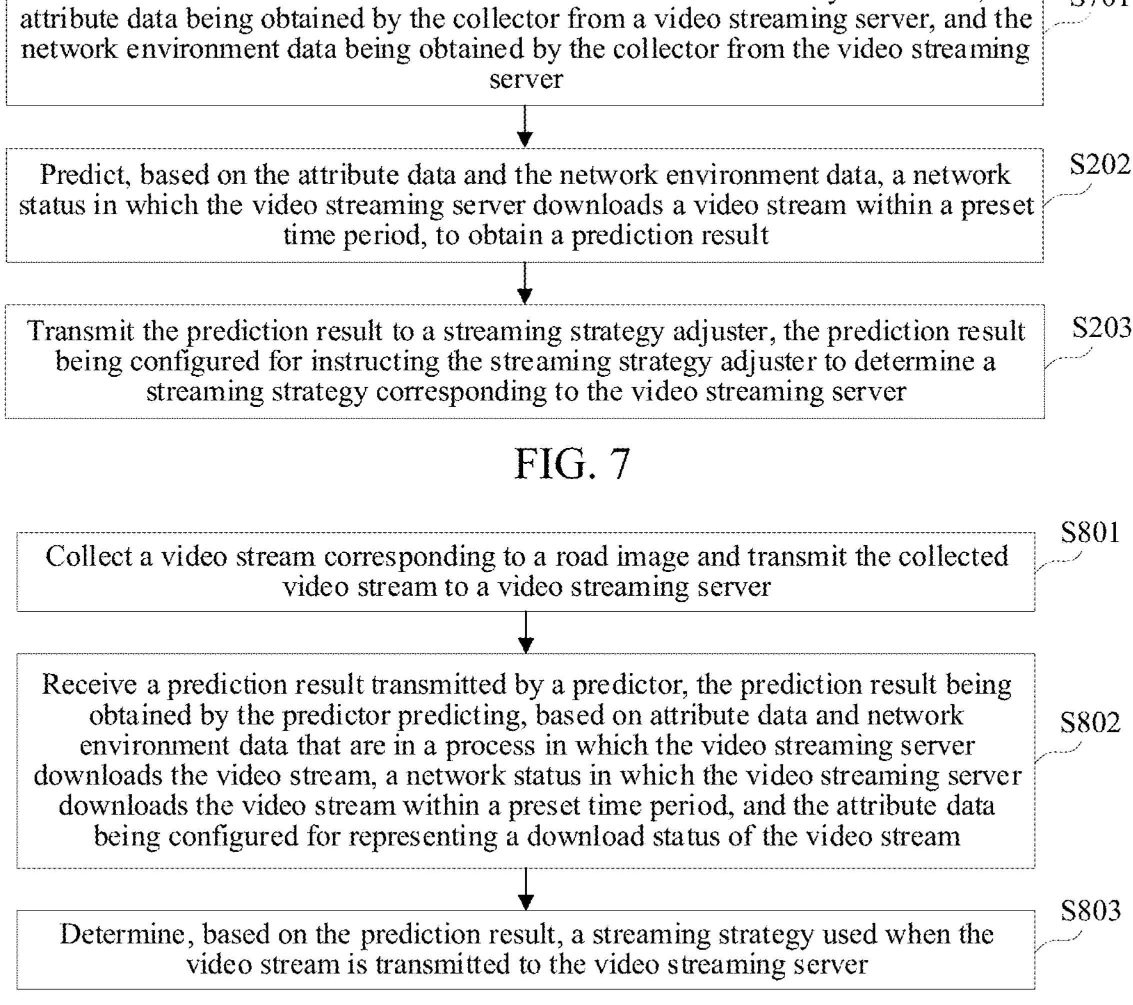
FIG. 7 is a flowchart of another example control method for video stream transmission according to one or more aspects described herein.
FIG. 8 is a flowchart of an example control method for video stream transmission according to one or more aspects described herein.

According to further aspects, another example control method for video stream transmission is provided, and the control method for video stream transmission may be performed by the first server 103 as the predictor. As shown in FIG. 7, the control method for video stream transmission may include S701, S202 and S203.

S701 is described in detail as follows:

S701: Receive the attribute data and network environment data transmitted by the collector. The attribute data may be obtained by the collector from the video streaming server, and the network environment data may be obtained by the collector from the video streaming server.

The attribute data obtained by the predictor may be transmitted by the collector. The attribute data transmitted by the collector may be obtained from the video streaming server. In other words, the attribute data obtained by the predictor may be forwarded by the intermediary “collector”.

In some examples, the attribute data obtained by the predictor may be transmitted by the video streaming server.

In other words, the attribute data obtained by the predictor may be transmitted directly by the video streaming server without being forwarded by the intermediary "collector".

The network environment data obtained by the predictor may be transmitted by the collector. The network environment data transmitted by the collector may be obtained from the video streaming server. In other words, the network environment data obtained by the predictor may be forwarded by the intermediary "collector".

In some examples, the network environment data obtained by the predictor may be transmitted by the video streaming server. In other words, the network environment data obtained by the predictor may be transmitted directly by the video streaming server without being forwarded by the intermediary "collector".

The details of S202 and S203 shown in FIG. 7 are substantially similar to the details of S202 and S203 shown in FIG. 2. Accordingly, those details are not repeated here.

The attribute data and network environment data obtained by the predictor may be transmitted by the collector, and can be obtained from more sources. This is suitable for many scenarios.

The processes and aspects described with respect to FIG. 2 to FIG. 7 are explained from the perspective of the predictor. Implementation details of the technical solutions are next described in detail from the perspective of the collector with reference to FIG. 8 to FIG. 13.

FIG. 8 is a flowchart of an example control method for video stream transmission. The control method for video stream transmission may be performed by the first terminal device 101 as the collector. As shown in FIG. 8, the control method for video stream transmission includes at least S801 to S803, and details are as follows:

S801: Collect a video stream corresponding to a road image and transmit the collected video stream to a video streaming server.

In this arrangement, the collector can collect, according to a specific collection period, the video stream corresponding to the road image, and transmit the collected video stream to the video streaming server. For example, assuming that the collection period is five minutes, the video stream corresponding to the road image may be collected within the five minutes, and then the video stream corresponding to the road image collected within the five minutes may be transmitted to the video streaming server.

In one or more examples, the collector can collect the video stream corresponding to the road image in real time and stream the collected video stream into the video streaming server. For example, each time a video stream corresponding to a road image is collected, the collected video stream corresponding to the road image may be transmitted to the video streaming server.

S802: Receive a prediction result transmitted by a predictor. The prediction result may be obtained by the predictor predicting, based on attribute data and network environment data that are in a process in which the video streaming server downloads a video stream, a network status in which the video streaming server downloads the video stream within a preset time period, and the attribute data may be configured for representing a download status of the video stream.

In some examples, the collector can receive the prediction result transmitted by the predictor. For an obtaining process of the prediction result, refer to the detailed descriptions above.

S803: Determine, based on the prediction result, a streaming strategy used when the video stream is transmitted to the video streaming server.

In one example, after the collector receives the prediction result transmitted by the predictor, the collector can determine, based on the prediction result, the streaming strategy used when the video stream is transmitted to the video streaming server. In other words, the video stream may flow out from the collector and then flow into the video streaming server.

According to one or more aspects, the collector may receive the prediction result transmitted by the predictor, and determine, based on the prediction result, the streaming strategy used when the video stream is transmitted to the video streaming server. Because the prediction result is determined by the predictor based on the attribute data and network environment data that are in the process in which the video streaming server downloads the video stream, the prediction result can more accurately reflect a network status of the video streaming server in a future preset time period. Correspondingly, the collector may determine, based on the prediction result, the streaming strategy used when the video stream is transmitted to the video streaming server, and stream the video stream to the video streaming server based on the streaming strategy, so that it is ensured that the collector streams the video stream to the video streaming server, and the streaming is better adapted to future network changes, thereby achieving proper control of the streaming to the video streaming server.

Figures 9, 10:
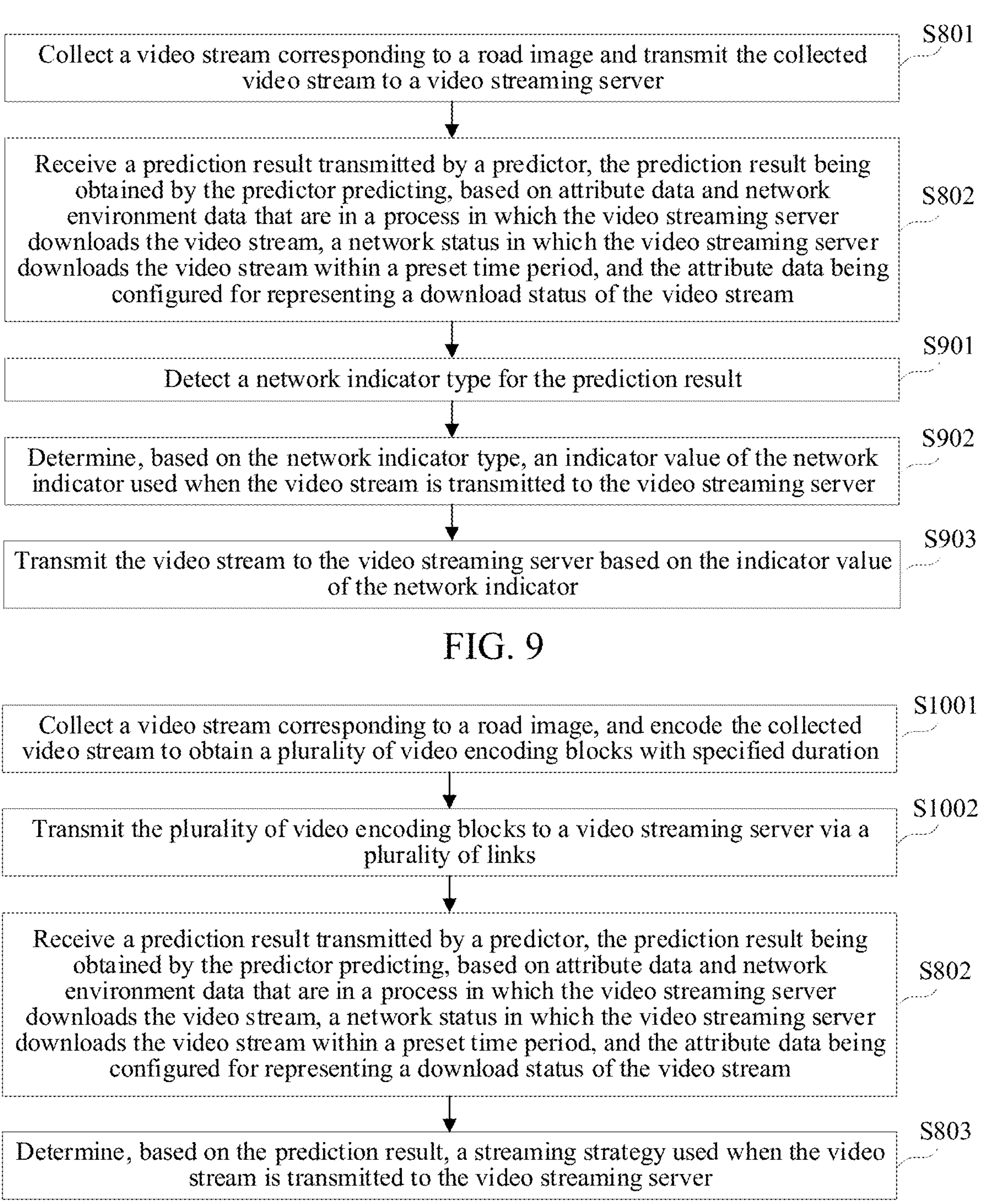
FIG. 9 is a flowchart of another example control method for video stream transmission according to one or more aspects described herein.
FIG. 10 is a flowchart of another example control method for video stream transmission according to one or more aspects described herein.

According to one or more aspects, another example control method for video stream transmission is provided, and the control method for video stream transmission may be performed by the first terminal device 101 as the collector. As shown in FIG. 9, the control method for video stream transmission may include S901 to S903, S801, and S802.

S901 to S903 are described in detail as follows:

S901: Detect a network indicator type for the prediction result.

As described above, the predictor may obtain the prediction results corresponding to the plurality of types of network indicators. Therefore, in such cases, after the prediction result is received, the collector can detect the network indicator type for the prediction result.

For example, assuming that the predictor obtains the prediction result corresponding to the delay indicator type and transmits the prediction result to the collector, the collector may receive the prediction result, and it can be detected that the prediction result is for the delay indicator type. Alternatively, assuming that the predictor obtains the prediction result corresponding to the throughput indicator type and transmits the prediction result to the collector, the collector may receive the prediction result, and it can be detected that the prediction result is for the throughput indicator type.

S902: Determine, based on the network indicator type, an indicator value of the network indicator used when the video stream is transmitted to the video streaming server.

According to one or more aspects, the collector may detect the network indicator type for the prediction result, and then determine, based on the network indicator type, the indicator value of the network indicator used when the video stream is transmitted to the video streaming server.

In one or more examples, the indicator value may be configured for representing a size of the network indicator or a performance of the network indicator. For example, for the code rate indicator, a size of the code rate indicator may be associated with a unit of the code rate indicator, and units are bits per second (bps), kilobits per second (kbps, k=1000), and megabits per second (Mbps, M=1000000). A higher code rate (that is, a larger unit or larger value before the unit, for example, 10 Mbps>10 kbps>10 bps, 10 Mbps>5 Mbps) may indicate better quality of audio and video and a larger encoded file, and vice versa. A lower code rate may indicate worse quality of audio and video and a smaller encoded file.

For example, for the code rate indicator, assuming that the collector streams, at time t1, the video stream to the video server based on 10 Mbps, and then based on the prediction result corresponding to the code rate indicator type, the indicator value of the code rate indicator may be adjusted from 10 Mbps to 5 Mbps.

S903: Transmit the video stream to the video streaming server based on the indicator value of the network indicator.

In one or more examples, after the collector determines, based on the type of the network indicator, the indicator value of the network indicator when the video streaming server is streamed, the video stream can be streamed to the video streaming server based on the indicator value of the network indicator.

For example, following the foregoing examples, the collector may stream, at time t2, the video stream to the video streaming server based on 5 Mbps, where Time t2 is later than time t1. The code rate indicator is only used as an example for descriptions. Other indicators may be used and may be similar, and so on.

The details of S801 and S802 shown in FIG. 9 are substantially similar to the details of S801 and S802 shown in FIG. 8. Accordingly, those details are not repeated here.

In one or more arrangements, the collector may detect the network indicator type for the prediction result, determine the indicator value of the network indicator based on the network indicator type, and then stream to the video streaming server based on the indicator value of the network indicator. This may achieve streaming and control in a network indicator dimension, ensure that an indicator value of a specific network indicator matches a future network status of the video streaming server indicated by the prediction result, in other words, ensure that the collector streams the video stream, and the streaming may be better adapted to future network changes, thereby achieving proper control of the streaming to the video streaming server.

According to one or more additional aspects, another example control method for video stream transmission is provided, and the control method for video stream transmission may be performed by the first terminal device 101 as the collector. As shown in FIG. 10, the control method for video stream transmission may include S1001 to S1002, S802, and S803.

S1001 and S1002 are described in detail as follows:

S1001: Collect a video stream corresponding to a road image, and encode the collected video stream to obtain a plurality of video encoding blocks with specified duration.

The collector may encode the collected video stream to obtain the plurality of video encoding blocks with specified duration.

The specified duration can be set by users. For example, if the specified duration is five seconds, then the collected video stream is encoded to obtain a plurality of video encoding blocks with five seconds.

S1002: Transmit the plurality of video encoding blocks to a video streaming server via a plurality of links.

In one or more arrangements, after the collector encodes the collected video stream to obtain the plurality of video encoding blocks with specified duration, the plurality of video encoding blocks may be transmitted to the video streaming server via the plurality of links.

For example, following the foregoing example, assuming that the plurality of links are established between the collector and the video streaming server for communication, then the plurality of video encoding blocks obtained with five seconds may be transmitted to the video streaming server via the plurality of links.

In one or more arrangements, the collector may transmit, based on a real-time streaming protocol (RTSP), the plurality of video encoding blocks to the video streaming server via the plurality of links.

S1001 to S1002 may be a process in which the collector transmits the collected video stream to the video streaming server, or may be a process in which the collector transmits the video stream to the video streaming server based on the determined indicator value of the network indicator.

The details of S802 and S803 shown in FIG. 10 are substantially similar to the details of S802 and S803 shown in FIG. 8. Accordingly, those details are not repeated here.

According to one or more arrangements, the collector may encode the video stream into the plurality of video encoding blocks and transmit the plurality of video encoding blocks to the video streaming server via the plurality of links. In this way, chunking can reduce an amount of cache required for the link at the same time, reduce a transmission delay of the video stream, and avoid the video streaming server being unable to adapt to the download due to excessive video stream resources and direct streaming to the video streaming server as well as poor viewing effect, such as lagging, delay, unclearness (e.g., fuzziness, pixilation, lack of clarity), or the like. In addition, a transmission rate of the video stream can be improved via the plurality of links.

Figures 11, 12:
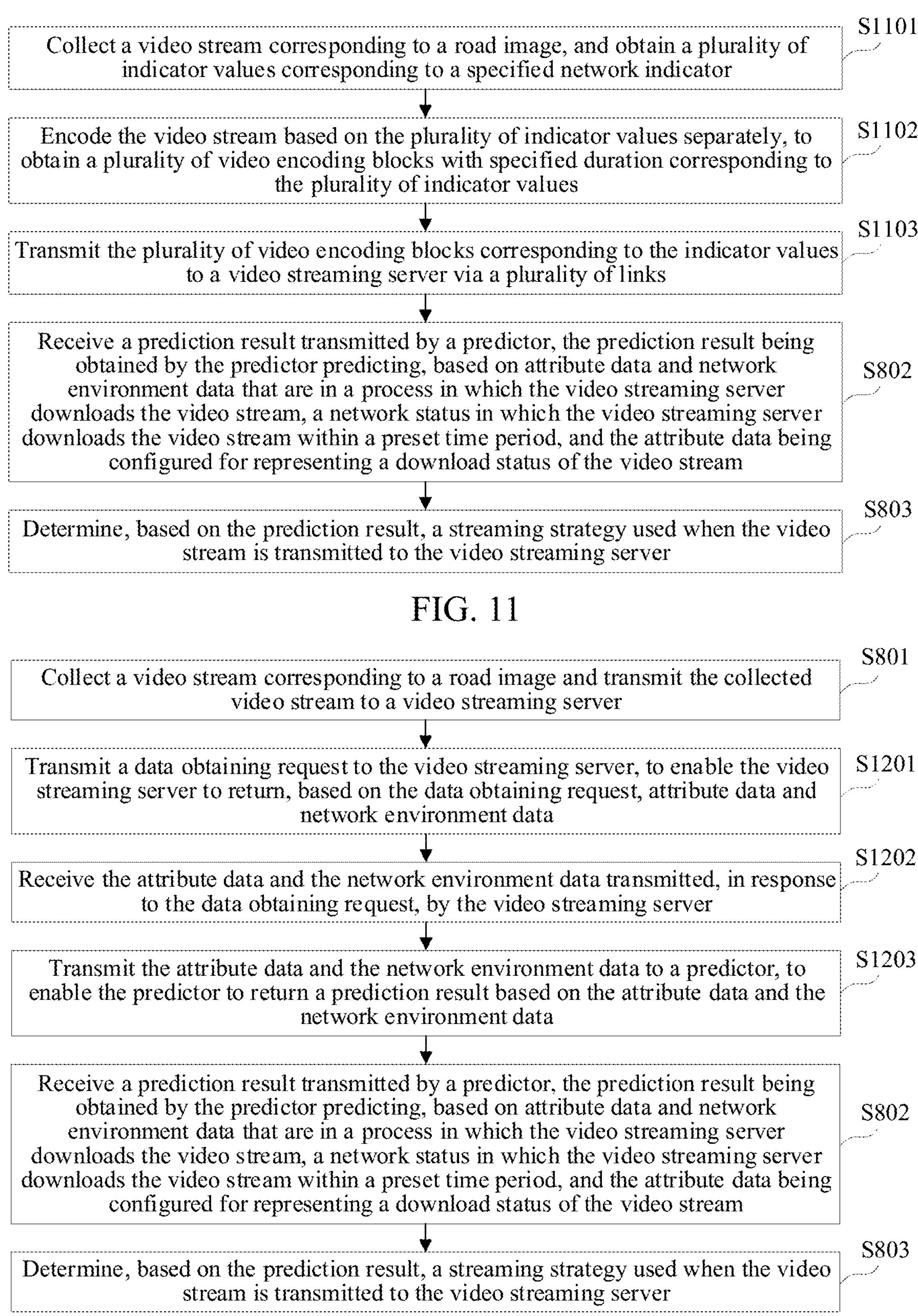
FIG. 11 is a flowchart of another example control method for video stream transmission according to one or more aspects described herein.
FIG. 12 is a flowchart of another example control method for video stream transmission according to one or more aspects described herein.

According to one or more aspects, another example control method for video stream transmission is provided, and the control method for video stream transmission may be performed by the first terminal device 101 as the collector. As shown in FIG. 11, the control method for video stream transmission may include S1101 to S1103, S802, and S803.

S1101 to S1103 are described in detail as follows:

S1101: Collect the video stream corresponding to the road image, and obtain a plurality of indicator values corresponding to a specified network indicator.

The collector may also obtain the plurality of indicator values corresponding to the specified network indicator.

The specified network indicator may refer to any one or more network indicators specified by relevant workers. For example, the specified network indicator may be a code rate indicator.

S1102: Encode the video stream based on the plurality of indicator values separately, to obtain a plurality of video encoding blocks with specified duration corresponding to the plurality of indicator values.

After the collector obtains the plurality of indicator values corresponding to the specified network indicator, the video stream may be encoded based on the plurality of indicator values separately, to obtain the plurality of video encoding blocks with specified duration corresponding to the plurality of indicator values.

For example, following the foregoing example, for the code rate indicator, assuming that the collector obtains the indicator values corresponding to the code rate indicator are 8 Mbps, 5 Mbps, 3 Mbps, and the like, the collector may encode the collected video stream based on 8 Mbps to obtain a plurality of video encoding blocks with five seconds corresponding to 8 Mbps, encode the collected video stream based on 5 Mbps to obtain a plurality of video encoding blocks with five seconds corresponding to 5 Mbps, and encode the collected video stream based on 3 Mbps to obtain a plurality of video encoding blocks with five seconds corresponding to 3 Mbps.

S1103: Transmit the plurality of video encoding blocks corresponding to the indicator values to the video streaming server via the plurality of links.

After the collector encodes, based on the plurality of indicator values, the collected video stream separately, to obtain the plurality of video encoding blocks with specified duration corresponding to the plurality of indicator values, the plurality of video encoding blocks corresponding to the indicator values may be transmitted to the video streaming server via the plurality of links.

For example, following the foregoing examples, the collector may transmit the plurality of obtained video encoding blocks with five seconds corresponding to 8 Mbps to the video streaming server via the plurality of links, transmit the plurality of obtained video encoding blocks with five seconds corresponding to 5 Mbps to the video streaming server via the plurality of links, and transmit the plurality of obtained video encoding blocks with five seconds corresponding to 3 Mbps to the video streaming server via the plurality of links.

The details of S802 and S803 shown in FIG. 11 are substantially similar to the details of S802 and S803 shown in FIG. 8. Accordingly, those details are not repeated here.

The collector may encode the collected video stream based on the plurality of indicator values of the same network indicator, and transmit the plurality of video encoding blocks corresponding to the indicator values to the video streaming server. In this way, the collector may essentially transmit a plurality of versions of video streams for the same network indicator to the video streaming server. For example, when the network indicator is the code rate, it may mean transmitting a plurality of code rate versions of video streams to the video streaming server. This may enable the video streaming server to flexibly download a required version of video stream based on a network status.

According to one or more other aspects, another example control method for video stream transmission is provided, and the control method for video stream transmission may be performed by the first terminal device 101 as the collector. As shown in FIG. 12, the control method for video stream transmission may further include S1201 to S1203 after S801.

S1201 to S1203 are described in detail as follows:

S1201: Transmit a data obtaining request to the video streaming server, to enable the video streaming server to return, based on the data obtaining request, attribute data and network environment data.

In one or more examples, when the collector has a prediction need, the collector can transmit the data obtaining request to the video streaming server. The data obtaining request may be configured for instructing the video streaming server to return the attribute data and network environment data.

S1202: Receive the attribute data and the network environment data transmitted, in response to the data obtaining request, by the video streaming server.

In one or more arrangements, the video streaming server can return the attribute data and the network environment data to the collector based on the received data obtaining request transmitted by the collector. Correspondingly, the collector can receive the attribute data and network environment data transmitted by the video streaming server.

S1203: Transmit the attribute data and the network environment data to the predictor, to enable the predictor to return a prediction result based on the attribute data and the network environment data.

In some examples, after the collector receives the attribute data and network environment data transmitted by the video streaming server, the attribute data and the network environment data can be transmitted to predictor. In this way, the predictor can predict, based on the attribute data and network environment data, the network status in which the video streaming server downloads the video stream within the preset time period, to obtain the prediction result and return the prediction result. Details of such processes are provided in the foregoing description.

The details of S801 to S803 shown in FIG. 12 are substantially similar to the details of S801 to S803 shown in FIG. 8. Accordingly, those details are not repeated here.

According to one or more aspects, the collector may be used as an intermediary to transmit the attribute data and network environment data obtained from the video streaming server to the predictor. This is suitable for many scenarios.

Figures 13, 14:
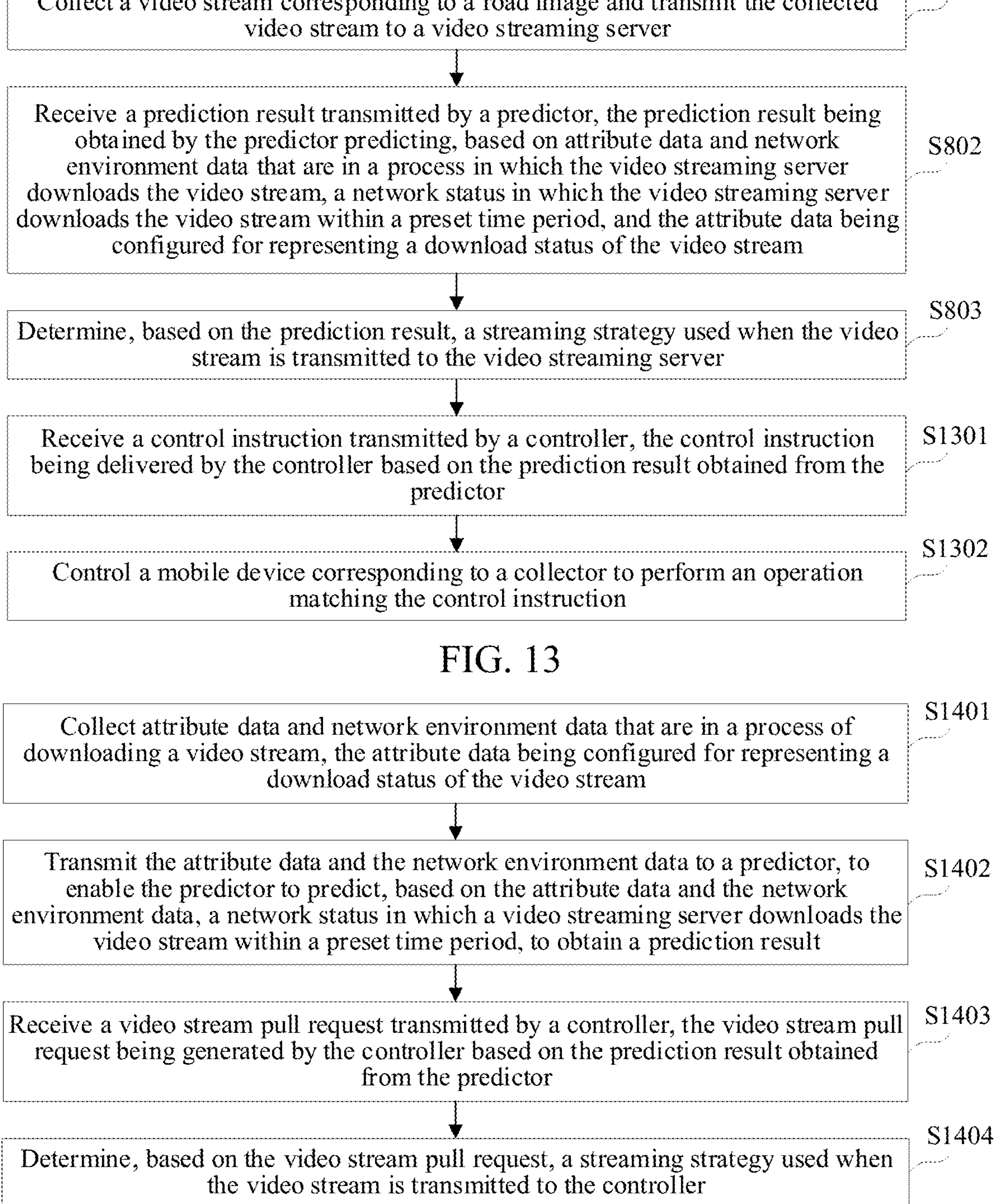
FIG. 13 is a flowchart of another example control method for video stream transmission according to one or more aspects described herein.
FIG. 14 is a flowchart of an example control method for video stream transmission according to one or more aspects described herein.

According to further aspects, another example control method for video stream transmission is provided, and the control method for video stream transmission may be performed by the first terminal device 101 as the collector. As shown in FIG. 13, the control method for video stream transmission may further include S1301 and S1302 after S803.

S1301 and S1302 are described in detail as follows:

S1301: Receive a control instruction transmitted by the controller. The control instruction may be delivered by the controller based on the prediction result obtained from the predictor.

As described in the foregoing examples, the streaming strategy adjuster may include the collector and the controller. If the controller receives the prediction result transmitted by the predictor, the controller can generate the control instruction based on the prediction result and transmit the control instruction to the collector. Correspondingly, the collector can receive the control instruction transmitted by the controller.

S1302: Control a mobile device corresponding to the collector to perform an operation matching the control instruction.

After the collector receives the control instruction transmitted by the controller, the collector can control the mobile device corresponding to the collector to perform the operation matching the control instruction.

In some examples, the process of controlling a mobile device corresponding to the collector to perform an operation matching the control instruction in S1302 may include at least the following two cases:

In a first case, if the control instruction is an instruction for instructing to slow down a traveling speed, then the mobile device corresponding to the collector may be controlled to perform the operation of slowing down the traveling speed.

In a second case, if the control instruction is an instruction for instructing to stop traveling, then the mobile device corresponding to the collector may be controlled to perform the operation of stopping the traveling.

The mobile device corresponding to the collector includes, but is not limited to, a vehicle, a robot, a movable toy, and the like.

The details of S801 and S803 shown in FIG. 13 are substantially similar to the details of S801 and S803 shown in FIG. 8. Accordingly, the details are not repeated here.

In one or more arrangements, the collector can receive the control instruction transmitted by the controller, and then control the mobile device corresponding to the collector to perform the operation matching the control instruction. In other words, remote control of the mobile device by the controller may be implemented. This is suitable for many scenarios.

FIG. 8 to FIG. 13 are described from the perspective of the collector. The implementation details of the technical solutions from the perspective of the video streaming server are described in detail with reference to FIG. 14 to FIG. 16.

FIG. 14 is a flowchart of an example control method for video stream transmission. The control method for video stream transmission may be performed by the second server 104 as the video streaming server. As shown in FIG. 14, the control method for video stream transmission includes at least S1401 to S1404, and details are as follows:

S1401: Collect attribute data and network environment data that are in a process of downloading a video stream. The attribute data may be configured for representing a download status of the video stream.

The video streaming server may collect the attribute data and the network environment data that are in the process of downloading the video stream. As described herein, the video streaming server may collect the attribute data from the application layer in the network structure, and collect the network environment data from the network layer in the network structure.

S1402: Transmit the attribute data and the network environment data to a predictor, to enable the predictor to predict, based on the attribute data and the network environment data, a network status in which the video streaming server downloads the video stream within a preset time period, to obtain a prediction result.

In some examples, after the video streaming server collects the attribute data and network environment data that are in the process of downloading the video stream, the attribute data and the network environment data may be transmitted to the predictor. In this way, the predictor can predict, based on the attribute data and network environment data, the network status in which the video streaming server downloads the video stream within the preset time period to obtain the prediction result. Details of an obtaining process of the prediction result are provided in the foregoing description.

S1403: Receive a video stream pull request transmitted by a controller. The video stream pull request may be generated by the controller based on the prediction result obtained from the predictor.

As described herein, the controller can receive the prediction result transmitted by the predictor. In addition to generating a control instruction based on the prediction result, the controller can also generate the video stream pull request based on the prediction result and transmit the video stream pull request to the video streaming server. Correspondingly, the video streaming server can receive the video stream pull request transmitted by the controller.

S1404: Determine, based on the video stream pull request, a streaming strategy used when the video stream is transmitted to the controller.

The video streaming server may receive the video stream pull request transmitted by the controller, and can then determine, based on the video stream pull request, the streaming strategy used when the video stream is transmitted to the controller. In other words, the video stream may flow out from the video streaming server and then flow into the controller.

According to some aspects, the video streaming server may transmit the collected attribute data and network environment data to the predictor, thereby providing strong support for the predictor to predict the network status in which the video streaming server downloads the video stream within the preset time period. In addition, the video stream pull request transmitted by the controller may be received, and the video stream pull request transmitted by the controller may also be generated based on the prediction result obtained by the predictor. Furthermore, the video streaming server may determine, based on the video stream pull request, the streaming strategy used when the video stream is transmitted to the controller. Because the video stream pull request may be generated based on the prediction result generated by the predictor, and the prediction result may be determined based on the attribute data and the network environment data that are in the process in which the video streaming server downloads the video stream, a network status of the video streaming server in a future preset time period can be more accurately reflected. Correspondingly, the video streaming server may determine, based on the video stream pull request, the streaming strategy used when the video stream is transmitted to the controller, so that it can be ensured that the determined streaming strategy is adapted to the network status in the future preset time period. Correspondingly, the video stream may be streamed to the controller based on the streaming strategy, thereby ensuring that streaming of the video stream is better adapted to future network changes and properly controlling the streaming strategy of the video streaming server.

Figures 15, 16:
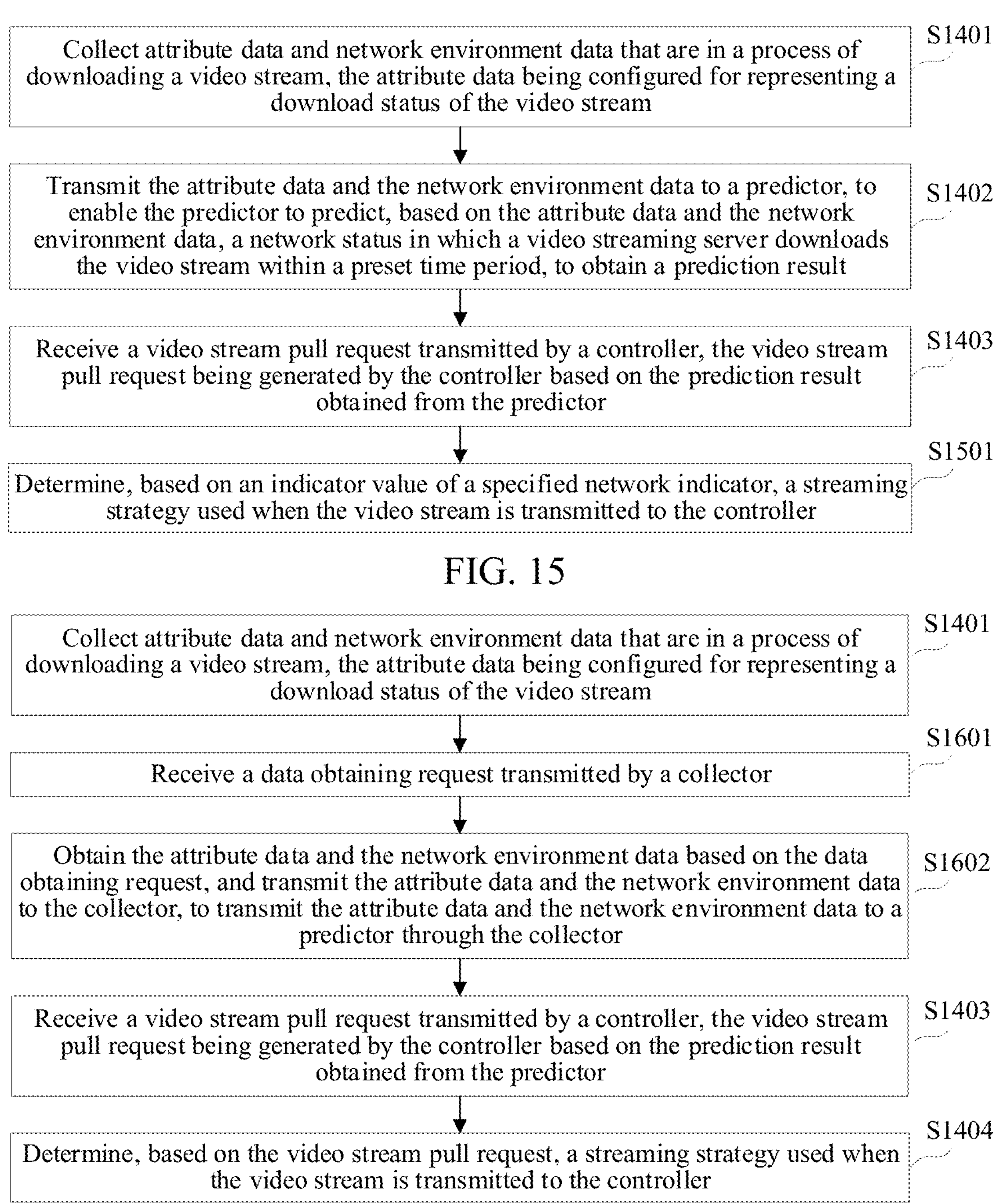
FIG. 15 is a flowchart of another example control method for video stream transmission according to one or more aspects described herein.
FIG. 16 is a flowchart of another example control method for video stream transmission according to one or more aspects described herein.

According to still other aspects, another example control method for video stream transmission is provided, and the control method for video stream transmission may be performed by the second server 104 as the video streaming server. As shown in FIG. 15, the control method for video stream transmission may include S1401 to S1403, and S1501. The video stream pull request may carry an indicator value of a specified network indicator.

S1501 is described in detail as follows:

S1501: Determine, based on the indicator value of the specified network indicator, the streaming strategy used when the video stream is transmitted to the controller.

As described herein, the controller can generate the video stream pull request based on the prediction result. The video stream pull request may carry the indicator value of the specified network indicator. In this way, the video streaming server can determine, based on the indicator value of the specified network indicator, the streaming strategy used when the video stream is transmitted to the controller.

Indicator values are described in the foregoing descriptions.

In some examples, it may be assumed that an indicator value of a code rate indicator carried in the video stream pull request is 5 Mbps, and the video streaming server streams, at time t1, the video stream to the controller based on 10 Mbps, then the video streaming server can adjust the indicator value of the code rate indicator from 10 Mbps to 5 Mbps based on the indicator value of the code rate indicator 5 Mbps carried in the video stream pull request, and then, the video streaming server may transmit, at time t2, the video stream to the controller based on 5 Mbps, where time t2 is later than time t1. The code rate indicator is only used as an example. Other indicators may be used and may be similar, and so on.

Details of S1401 and S1403 shown in FIG. 15 are substantially similar to the details of S1401 and S1403 shown in FIG. 14. Accordingly, those details are not repeated here.

In one or more arrangements, the video streaming server may perform the streaming to the controller based on the indicator value of the specified network indicator carried in the video stream pull request, so that control of streaming in a network indicator dimension is implemented and it may be ensured that the indicator value of the specific network indicator is adapted to a future network status of the video streaming server indicated by the prediction result, thereby ensuring that the streaming is adapted to the future network changes, and properly controlling the streaming strategy of the video streaming server.

According to one or more aspects, another example control method for video stream transmission is provided, and the control method for video stream transmission may be performed by the second server 104 as the video streaming server. As shown in FIG. 16, the control method for video stream transmission may include S1401, S1601 and S1602, and S1403 and S1404. The video stream pull request may carry an indicator value of a specified network indicator.

S1601 and S1602 are described in detail as follows:

S1601: Receive a data obtaining request transmitted by a collector.

As described herein, when the collector has a prediction need, the collector can transmit the data obtaining request to the video streaming server. The data obtaining request may be configured for instructing the video streaming server to return the attribute data and network environment data. Correspondingly, the video streaming server can receive the data obtaining request transmitted by the collector.

S1602: Obtain the attribute data and the network environment data based on the data obtaining request, and transmit the attribute data and the network environment data to the collector, to transmit the attribute data and the network environment data to the predictor through the collector.

In one or more examples, after receiving the data obtaining request transmitted by the collector, the video streaming server can obtain the attribute data and the network environment data based on the data obtaining request, and transmit the attribute data and the network environment data to the collector. In this way, the collector can transmit the attribute data and the network environment data to the predictor.

The details of S1401, S1403, and S1404 shown in FIG. 16 are substantially similar to the details of S1401, S1403, and S1404 shown in FIG. 14. Those details are not repeated here.

According to one or more arrangements, when the data obtaining request transmitted by the collector is received, the video streaming server can obtain and transmit the attribute data and the network environment data to the collector, and then forward the attribute data and the network environment data to the predictor through the collector. This is suitable for many scenarios.

Figure 17:
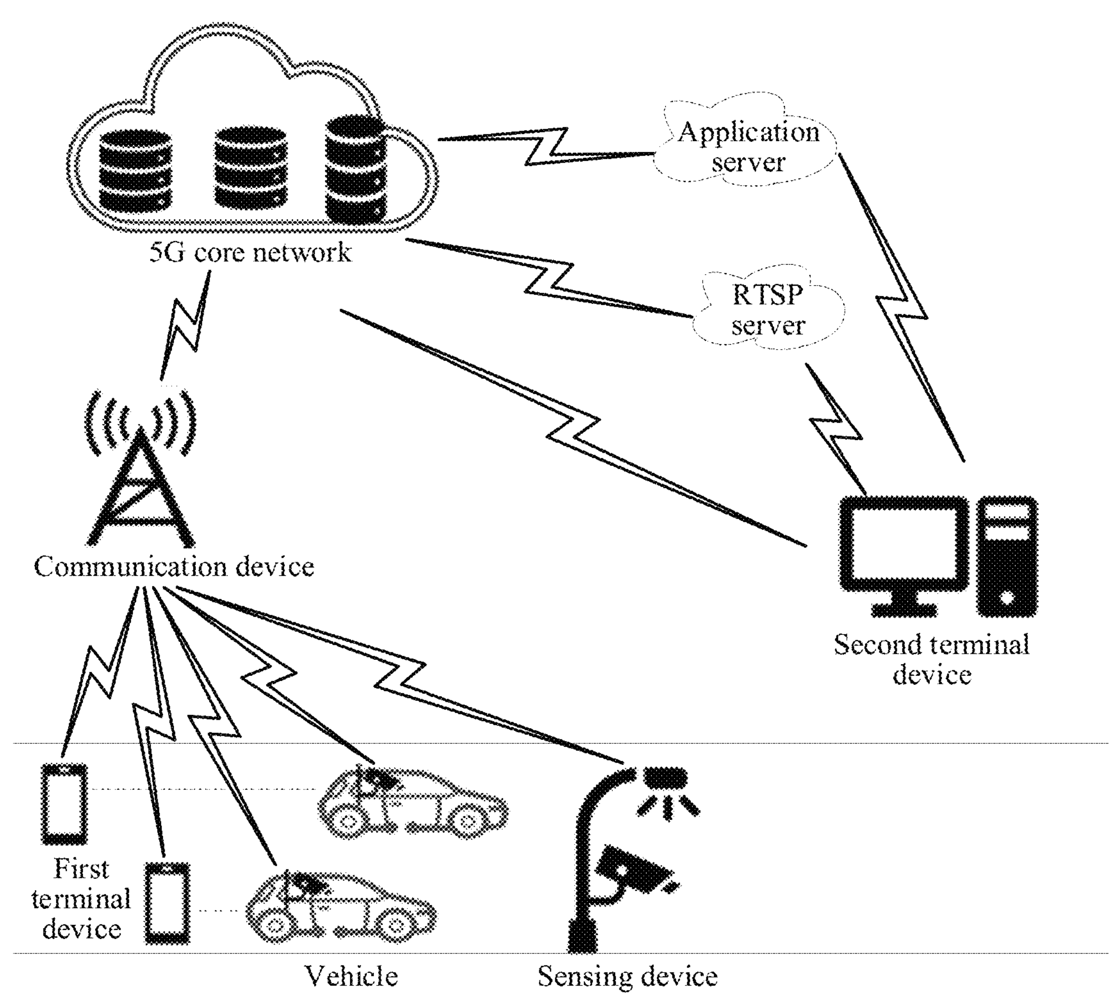
FIG. 17 is a schematic diagram of an example implementation environment in which one or more aspects described herein can be applied.

A specific scenario is described in detail below:

Refer to FIG. 17, the predictor (which may be an application server), the collector (which may be a sensing device, specifically a camera installed on a road or a camera installed on a vehicle), the video streaming server (which may be an RTSP server), the controller (which may be a second terminal device), the mobile device (which may be a vehicle, where the vehicle corresponds to a first terminal device, that is, an on-board terminal device), the communication device (which may be a base station), and a core network (which may be a 5G core network) may be the primary components included.

The application server may be primarily configured to: obtain attribute data that is in a process in which the RTSP server downloads the video stream, the attribute data being configured for representing a download status of the video stream; obtain network environment data that is in a process in which the RTSP server downloads the video stream; predict, based on the attribute data and the network environment data, a network status in which the RTSP server downloads the video stream within a preset time period, to obtain a prediction result; and transmit the prediction result to the streaming strategy adjuster, the prediction result being configured for instructing the streaming strategy adjuster to determine a streaming strategy for video stream transmission with the RTSP server. In one example, the streaming strategy adjuster may include, but is not limited to, the sensing device, the second terminal device, or the like.

In one arrangement, the application server may predict, based on the attribute data and the network environment data, the network status in which the RTSP server downloads the video stream within the preset time period, to obtain the prediction result. For example, this can be implemented via a trained prediction model.

Figure 18:
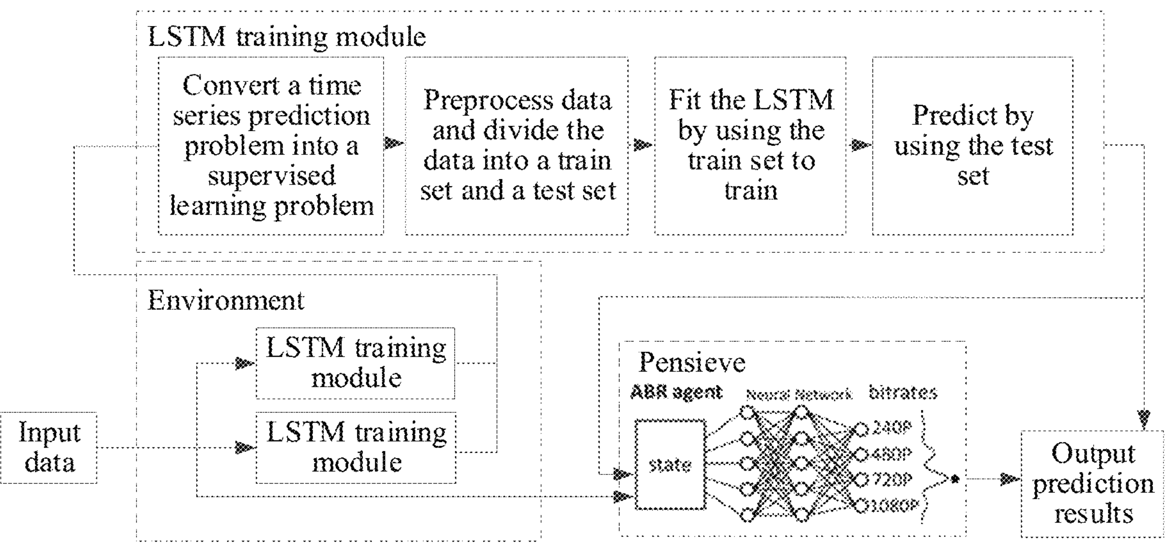
FIG. 18 is a schematic diagram of an example prediction model according to one or more aspects described herein.

In one example, referring to FIG. 18, the prediction model may be built and trained based on a DQN-LSTM algorithm. It may be necessary to pre-set input features, output features, prediction features, model parameters, average algorithm times, prediction time, model training and testing ratios, a quantity of iterations, model loss functions, model optimization functions, a quantity of machine learning neurons, and the like for the DQN algorithm. The LSTM algorithm may be primarily configured to adapt to changes in some network indicators (such as a delay indicator, and a throughput indicator). In addition, pensieve may be used as a basic framework. In one example, the attribute data and network environment data may be inputted into an LSTM training module (where two LSTM training modules are shown in FIG. 18, and a quantity of the LSTM training modules can be any number). Furthermore, the LSTM training module may first convert the attribute data and the network environment data into time series data, and can convert a time series prediction problem into a supervised learning problem. Then, the time series data may be preprocessed and divided into a training set and a test set. Next, the LSTM may be fitted by training the training set, and the test set may be used to predict. The LSTM training module may perform corresponding data exchange with the pensieve to output prediction results jointly (which may be prediction results corresponding to a code rate indicator type, a delay indicator type, a throughput indicator type).

The sensing device may be primarily configured to: collect a video stream corresponding to a road image and transmit the collected video stream to the RTSP server; receive the prediction result transmitted by the application server, the prediction result being obtained by the application server predicting, based on the attribute data and the network environment data that are in the process in which the RTSP server downloads the video stream, the network status in which the RTSP server downloads the video stream within the preset time period, and the attribute data being configured for representing the download status of the video stream; and determine, based on the prediction result, a streaming strategy used when the video stream is transmitted to the RTSP server.

The RTSP server may be primarily configured to: collect the attribute data and network environment data that are in the process of downloading the video stream, the attribute data being configured for representing the download status of the video stream; transmit the attribute data and the network environment data to the application server to enable the application server to predict, based on the attribute data and network environment data, the network status in which the RTSP server downloads the video stream within the preset time period, to obtain the prediction result; receive the video stream pull request transmitted by the second terminal device, the video stream pull request being generated by the second terminal device based on the prediction result obtained from the application server; and determine, based on the video stream pull request, a streaming strategy used when the video stream is transmitted to the second terminal device.

The second terminal device may be primarily configured to: receive the prediction results transmitted by the application server, generate the video stream pull request based on the prediction result, and transmit the video stream pull request to the RTSP server. The video stream pull request is configured for instructing the RTSP server to determine, based on the video stream pull request, the streaming strategy used when the video stream is transmitted to the second terminal device.

The first terminal device may be primarily configured to receive the prediction result transmitted by the application server, and control, based on the prediction result, the vehicle corresponding to the first terminal device to perform a corresponding operation.

The base station and 5G core network may be primarily configured for communication between the foregoing application server, sensing device, second terminal device, and first terminal device to perform any data exchange.

Figure 19:
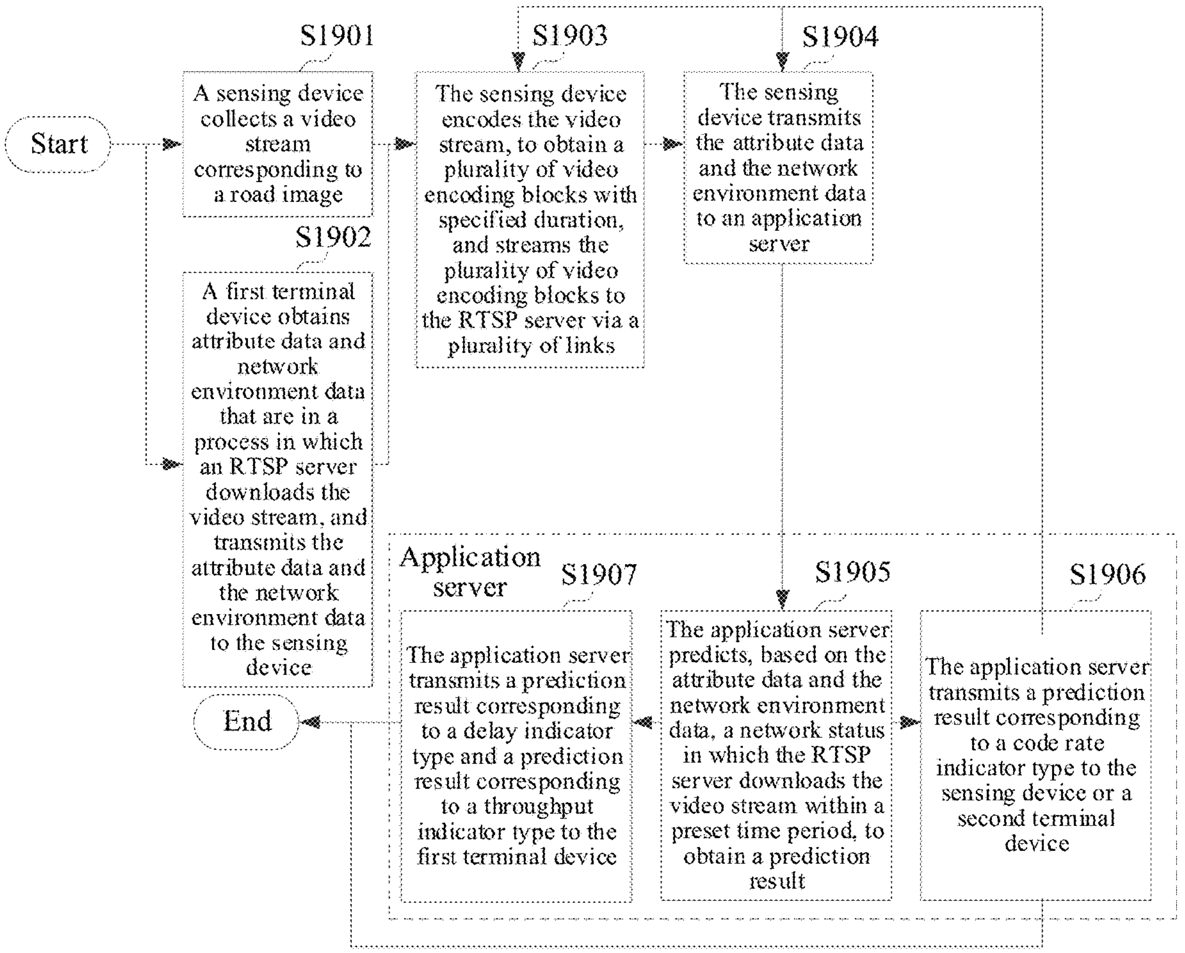
FIG. 19 is a flowchart of a control method for video stream transmission according to one or more aspects described herein.

Based on the foregoing smart transportation scenarios, reference is made to FIG. 19. FIG. 19 is a flowchart of an example control method for video stream transmission. As shown in FIG. 19, the control method for video stream transmission includes at least S1901 to S1907, and details are as follows:

S1901: The sensing device collects the video stream corresponding to the road image.

S1902: The first terminal device obtains the attribute data and the network environment data that are in the process in which the RTSP server downloads the video stream, and transmits the attribute data and the network environment data to the sensing device.

S1903: The sensing device encodes the collected video stream to obtain a plurality of video encoding blocks with specified duration, and transmits the plurality of video encoding blocks to the RTSP server via a plurality of links.

S1904: The sensing device transmits the attribute data and the network environment data to the application server.

The attribute data and the network environment data may be forwarded by the base station via the 5G core network.

S1905: The application server predicts, based on the attribute data and the network environment data, the network status in which the RTSP server downloads the video stream within the preset time period, to obtain the prediction result.

The prediction result may be the prediction result corresponding to the code rate indicator type, the prediction result corresponding to the delay indicator type, and the prediction result corresponding to the throughput indicator type.

S1906: The application server transmits the prediction result corresponding to the code rate indicator type to the sensing device or the second terminal device.

In one example, the sensing device may determine, based on the prediction result corresponding to the code rate indicator type, a bit rate used when the video stream is transmitted to the RTSP server. In other words, the sensing device may stream the video stream to the RTSP server based on the determined bit rate.

In another example, the second terminal device may generate the video stream pull request based on the prediction result corresponding to the code rate indicator type, and transmit the video stream pull request to the RTSP server, to enable the RTSP server to transmit, based on the code rate carried in the video stream pull request, the video stream to the second terminal device.

S1907: The application server transmits the prediction result corresponding to the delay indicator type and the prediction result corresponding to the throughput indicator type to the first terminal device.

The first terminal device may generate a control instruction based on the prediction result corresponding to the delay indicator type and the prediction result corresponding to the throughput indicator type, to enable the vehicle corresponding to the first terminal device to perform an operation matching the control instruction. For example, the control instruction may be an instruction for instructing to slow down a traveling speed, and then the vehicle performs the operation of slowing down the traveling speed. The control instruction may be an instruction for instructing to stop traveling, then the vehicle performs the operation of stopping traveling.

In one example, the application server may further transmit the prediction result corresponding to the delay indicator type and the prediction result corresponding to the throughput indicator type to the second terminal device, and then the second terminal device may generate the control instruction based on the prediction result corresponding to the delay indicator type and the prediction result corresponding to the throughput indicator type, and transmit the control instruction to the first terminal device, to enable the vehicle corresponding to the first terminal device to perform the operation matching the control instruction.

The details of S1901 to S1907 shown in FIG. 19 are substantially similar to the description provided above. Accordingly, these details are not repeated here.

In some examples, the attribute data and the network environment data may be jointly used to predict the network status in which the video streaming server downloads the video stream within the preset time period, so that accuracy of the prediction result is improved. In addition, video stream transmission may be implemented based on an RTSP streaming technology to generate a small delay. This process may be suitable for scenarios such as smart transportation with strong mobility, great network changes, and sensitive delay requirements, while security is ensured.

Figure 20:
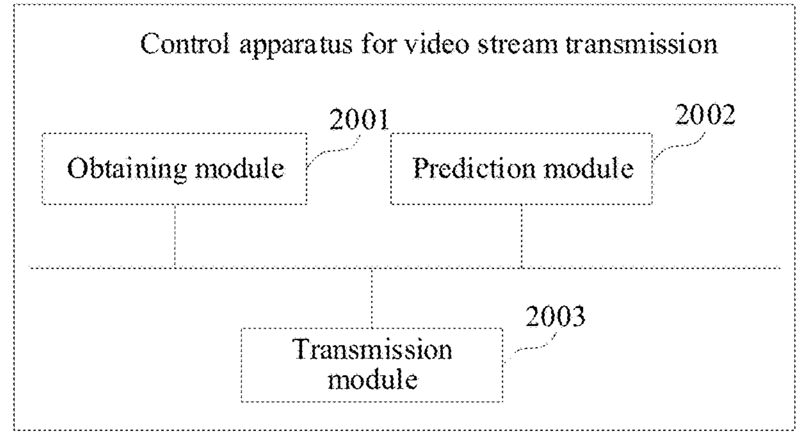
FIG. 20 is a block diagram of an example control apparatus for video stream transmission according to one or more aspects described herein.

FIG. 20 is a block diagram of an example control apparatus for video stream transmission. As shown in FIG. 20, the control apparatus for video stream transmission is deployed on a predictor, and the device includes:

- an obtaining module 2001, configured to obtain attribute data and network environment data that are in a process in which a video streaming server downloads a video stream, the attribute data being configured for representing a download status of the video stream;
- a prediction module 2002, configured to predict, based on the attribute data and the network environment data, a network status in which the video streaming server downloads the video stream within a preset time period, to obtain a prediction result; and a transmission module 2003, configured to transmit the prediction result to a streaming strategy adjuster, the prediction result being configured for instructing the streaming strategy adjuster to determine a streaming strategy corresponding to the video streaming server.

According to one or more aspects, the prediction module 2002 may include:

a processing unit, configured to perform structured processing on the attribute data and the network environment data to obtain structured data; and a prediction unit, configured to predict, based on the structured data, the network status in which the video streaming server downloads the video stream within the preset time period, to obtain the prediction result.

According to some aspects, the processing unit may be specifically configured to:

create first time series data based on timestamp information of the attribute data, and create second time series data based on timestamp information of the network environment data; and perform structured processing on the first time series data and the second time series data to obtain the structured data.

In one or more arrangements, the attribute data may include a plurality of types of first data. The processing unit may be further specifically configured to:

obtain timestamp information corresponding to the plurality of types of first data; and create, for the plurality of types, based on the timestamp information corresponding to the plurality of types of first data, first time series data corresponding to the plurality of types.

According to some aspects, the network environment data may include a plurality of types of second data. The processing unit may be further specifically configured to:

obtain timestamp information corresponding to the plurality of types of second data; and create, for the plurality of types, based on the timestamp information corresponding to the plurality of types of second data, second time series data corresponding to the plurality of types.

In some examples, the processing unit may be further specifically configured to:

preprocess the first time series data and the second time series data to obtain preprocessed first time series data and preprocessed second time series data, the preprocessing including at least one of abnormal data removal processing and duplicate data removal processing; and perform structured processing on the preprocessed first time series data and the preprocessed second time series data based on a preset structure network, to obtain the structured data.

Additionally or alternatively, the prediction unit may be specifically configured to:

input the structured data into a prediction model to predict, by using the prediction model, the network status in which the video streaming server downloads the video stream within the preset time period, to obtain the prediction result, the prediction model being built and trained based on at least one of a reinforcement learning algorithm and a deep learning algorithm.

According to some aspects, the prediction unit may be specifically configured to:

predict, based on the structured data in a direction of a plurality of types of network indicators, the network status in which the video streaming server downloads the video stream within the preset time period, to obtain prediction results corresponding to the plurality of types of network indicators.

In some examples, the obtaining module 2001 may be specifically configured to:

receive the attribute data and network environment data transmitted by a collector, the attribute data and the network environment data being obtained by the collector from the video streaming server.

Figure 21:
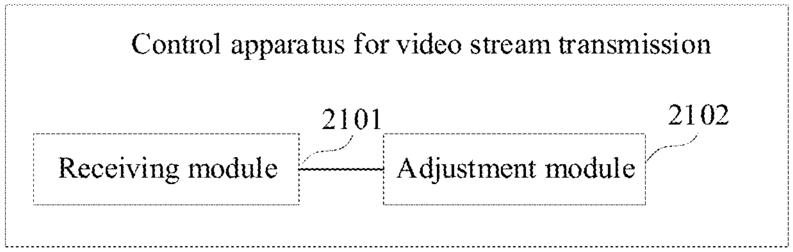
FIG. 21 is a block diagram of a control apparatus for video stream transmission according to one or more aspects described herein.

FIG. 21 is a block diagram of an example control apparatus for video stream transmission according to aspects described herein. As shown in FIG. 21, the control apparatus for video stream transmission is used in a collector, and the apparatus includes:

a receiving module 2101, configured to receive a prediction result transmitted by a predictor, the prediction result being obtained by the predictor predicting, based on attribute data and network environment data that are in a process in which a video streaming server downloads a video stream, a network status in which the video streaming server downloads the video stream within a preset time period, and the attribute data being configured for representing a download status of the video stream; and an adjustment module 2102, configured to determine, based on the prediction result, a streaming strategy used when the video stream is transmitted to the video streaming server.

According to one or more aspects, the adjustment module 2103 may be specifically configured to:

detect a network indicator type for the prediction result;

determine, based on the network indicator type, an indicator value of the network indicator used when the video stream is transmitted to the video streaming server; and transmit the video stream to the video streaming server based on the indicator value of the network indicator.

According to one or more arrangements, the apparatus may further include a collection module, configured to:

encode a collected video stream to obtain a plurality of video encoding blocks with specified duration; and transmit the plurality of video encoding blocks to the video streaming server via a plurality of links.

In some examples, the collection module may be further specifically configured to:

obtain a plurality of indicator values corresponding to a specified network indicator;

encode the collected video stream based on the plurality of indicator values separately, to obtain a plurality of video encoding blocks with specified duration corresponding to the plurality of indicator values; and transmit the plurality of video encoding blocks corresponding to the indicator values to the video streaming server via the plurality of links.

In some arrangements, the apparatus may further include:

a transmission module, configured to transmit a data obtaining request to the video streaming server;

a receiving module 2101, further configured to receive the attribute data and the network environment data transmitted, in response to the data obtaining request, by the video streaming server; and a transmission module, configured to transmit the attribute data and the network environment data to the predictor, to enable the predictor to return the prediction result based on the attribute data and the network environment data.

According to one or more aspects, the receiving module 2101 may be further configured to:

receive a control instruction transmitted by the controller, the control instruction being delivered by the controller based on the prediction result obtained from the predictor; and control a mobile device corresponding to the collector to perform an operation matching the control instruction.

Figure 22:
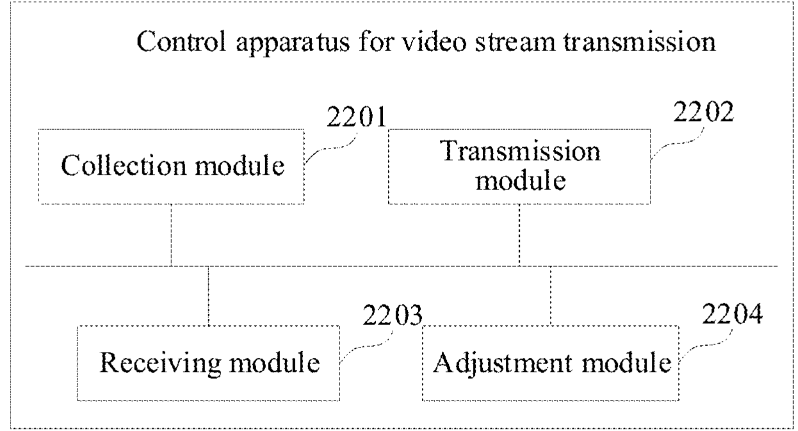
FIG. 22 is a block diagram of a control apparatus for video stream transmission according to one or more aspects described herein.

FIG. 22 is a block diagram of an example control apparatus for video stream transmission according to aspects described herein. As shown in FIG. 22, the control apparatus for video stream transmission is deployed on a video streaming server, and the apparatus includes:

a collection module 2201, configured to collect attribute data and network environment data that are in a process of downloading a video stream, the attribute data being configured for representing a download status of the video stream;

a transmission module 2202, configured to transmit the attribute data and the network environment data to a predictor, to enable the predictor to predict, based on the attribute data and the network environment data, a network status in which the video streaming server downloads the video stream within a preset time period, to obtain a prediction result;

a receiving module 2203, configured to receive a video stream pull request transmitted by a controller, the video stream pull request being generated by the controller based on the prediction result obtained from the predictor; and an adjustment module 2204, configured to determine, based on the video stream pull request, a streaming strategy used when the video stream is transmitted to the controller.

According to some aspects, the video stream pull request may carry an indicator value of a specified network indicator, and the adjustment module 2204 may be specifically configured to:

determine, based on the indicator value of the specified network indicator, the streaming strategy used when the video stream is transmitted to the controller.

In one or more examples, the transmission module 2202 may be specifically configured to:

receive a data obtaining request transmitted by a collector; and obtain the attribute data and network environment data based on the data obtaining request, and transmit the attribute data and network environment data to the collector, to transmit the attribute data and network environment data to the predictor through the collector.

The non-transitory computer-readable medium provided in the foregoing description may be directed to the same or similar concepts as the methods and processes described above. Examples of specific manners in which each module and unit may perform its operation is described in detail in the example methods and processes.

Aspects described herein also relate to an electronic device that includes: one or more processors; and a memory, configured to store one or more programs, the one or more programs, when executed by the one or more processors, enabling the electronic device to implement the various methods and processes for video stream transmission described herein.

Figure 23:
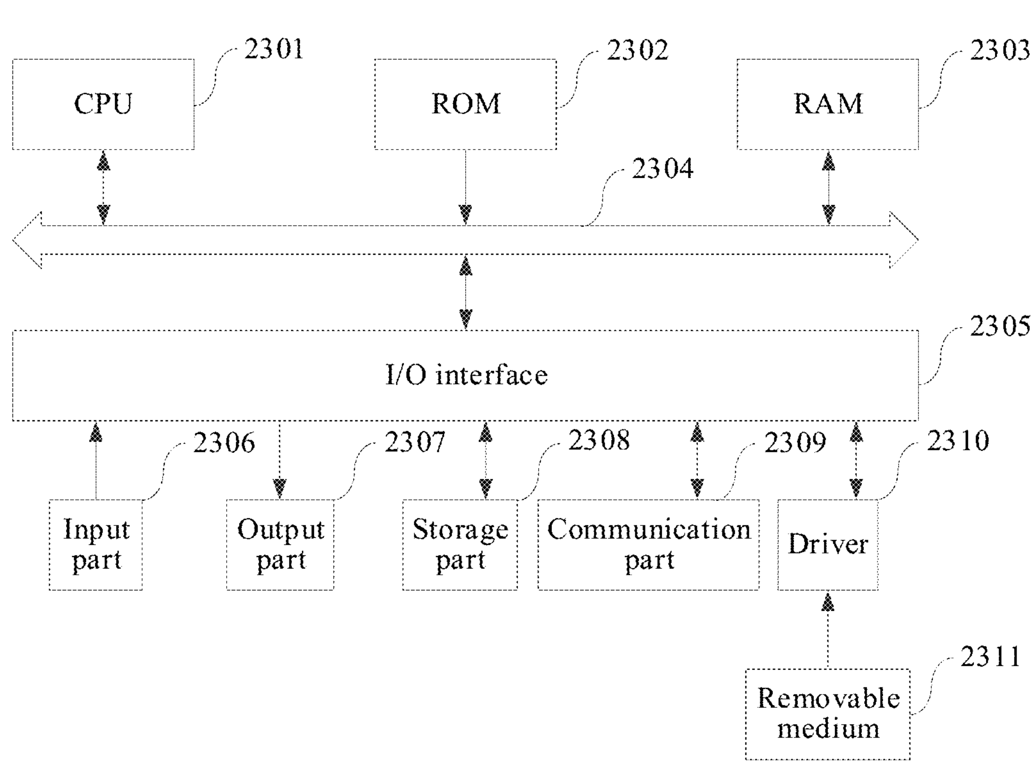
FIG. 23 is a schematic diagram of a structure of a computer system applied to implement an electronic device according to one or more aspects described herein.

FIG. 23 is a schematic diagram of a structure of an example computer system that may be used according to one or more aspects described herein.

The computer system 2300 of the electronic device shown in FIG. 23 is merely an example, and does not constitute any limitation on functions and use ranges of the aspects and concepts described herein.

As shown in FIG. 23, the computer system 2300 includes a central processing unit (CPU) 2301, which may perform various suitable actions and processing based on a program stored in a read-only memory (ROM) 2302 or a program loaded from a storage part 2308 into a random access memory (RAM) 2303, for example, perform the method described above. The RAM 2303 further stores various programs and data required for system operations. The CPU 2301, the ROM 2302, and the RAM 2303 are connected to each other through a bus 2304. An input/output (I/O) interface 2305 is also connected to the bus 2304.

The following components are connected to the I/O interface 2305: an input part 2306 including a keyboard, a mouse, or the like, an output part 2307 including a cathode ray tube (CRT), a liquid crystal display (LCD), a speaker, or the like, a storage part 2308 including a hard disk or the like, and a communication part 2309 including a network interface card such as a local area network (LAN) card and a modem. The communication part 2309 may perform communication processing by using a network such as the Internet. A driver 2310 is also connected to the I/O interface 2305 as required. A removable medium 2311, such as a magnetic disk, an optical disc, a magneto-optical disk, or a semiconductor memory, is installed on the driver 2310 as required, so that a computer program read from the removable medium is installed into the storage part 2308 as required.

In some arrangements, the processes described herein may be implemented as computer software programs. For example, a computer program product may include a computer program stored in a computer-readable medium. The computer program may include a computer program configured to perform methods and processes described herein. In such examples, the computer program may be downloaded and installed from a network through the communication part 2309, and/or installed from the removable medium 2311. When the computer program is executed by the central processing unit (CPU) 2301, the various functions described herein may be executed.

According to another aspect, a computer-readable medium is further provided, having a computer program stored thereon, the computer program, when executed by a processor, implementing the foregoing control methods and processes for video stream transmission. The computer-readable medium may be included in the electronic device described herein, or may exist alone, e.g., not disposed in the electronic device.

According to another aspect, a computer program product or a computer program is further provided. The computer program product or the computer program includes computer instructions stored on a computer-readable medium. A processor of a computer device may read the computer instructions from the computer-readable medium, and the processor may execute the computer instructions, so that the computer device performs the control method for video stream transmission provided in the various embodiments.

The foregoing descriptions are merely example aspects, and are not intended to limit the implementations of the features and concepts described herein. A person of ordinary skill in the art can make corresponding modifications and variations with case based on the concepts and spirit of the descriptions provided.

What is claimed is:

1. A control method for video stream transmission, performed by a computer-implemented predictor, the method comprising:

obtaining, by a computing device, attribute data and network environment data of a process in which a video streaming server is downloading or downloaded a video stream, the attribute data representing a download status of the video stream during the process;

predicting, by the computing device based on the attribute data and the network environment data, a network status in which the video streaming server downloads the video stream within a preset time period, to obtain a prediction result, the preset time period corresponding to a future time period, the predicting comprising:

performing, by the computing device, structured processing on the attribute data and the network environment data to obtain structured data; and predicting, based on the structured data, the network status in which the video streaming server downloads the video stream within the preset time period, to obtain the prediction result; and transmitting, by the computing device, the prediction result to a streaming strategy adjuster, the prediction result being configured for instructing the streaming strategy adjuster to determine a streaming strategy for the video streaming server to transmit or receive streaming video over a network.

2. The method according to claim 1, wherein the performing structured processing on the attribute data and the network environment data to obtain structured data comprises:

creating, by the computing device, first time series data based on timestamp information of the attribute data, and creating second time series data based on timestamp information of the network environment data; and performing structured processing on the first time series data and the second time series data to obtain the structured data.

3. The method according to claim 2, wherein the attribute data comprises a plurality of types of first data, and the creating first time series data based on timestamp information of the attribute data comprises:

obtaining, by the computing device, timestamp information corresponding to the plurality of types of first data; and creating, by the computing device for the plurality of types, based on the timestamp information corresponding to the plurality of types of first data, first time series data corresponding to the plurality of types; and the network environment data comprises a plurality of types of second data, and the creating second time series data based on timestamp information of the network environment data comprises:

obtaining, by the computing device, timestamp information corresponding to the plurality of types of second data; and creating, by the computing device for the plurality of types, based on the timestamp information corresponding to the plurality of types of second data, second time series data corresponding to the plurality of types.

4. The method according to claim 2, wherein the performing structured processing on the first time series data and the second time series data to obtain the structured data comprises:

preprocessing, by the computing device, the first time series data and the second time series data to obtain preprocessed first time series data and preprocessed second time series data, the preprocessing comprising at least one of abnormal data removal processing and duplicate data removal processing; and performing, by the computing device, structured processing on the preprocessed first time series data and the preprocessed second time series data based on a preset structure network, to obtain the structured data.

5. The method according to claim 1, wherein the predicting, by the computing device based on the structured data, the network status in which the video streaming server downloads the video stream within the preset time period, to obtain the prediction result comprises:

predicting, by the computing device based on the structured data in a direction of a plurality of types of network indicators, the network status in which the video streaming server downloads the video stream within the preset time period, to obtain prediction results corresponding to the plurality of types of network indicators.

6. An apparatus for controlling video stream transmissions, the apparatus comprising:

a processor; and memory storing computer-readable instructions that, when executed, cause the apparatus to:

obtain attribute data and network environment data of a process in which a video streaming server is downloading or downloaded a video stream, the attribute data representing a download status of the video stream during the process;

predict, based on the attribute data and the network environment data, a network status in which the video streaming server downloads the video stream within a preset time period, to obtain a prediction result, the preset time period corresponding to a future time period, the predicting comprising:

performing, by the computing device, structured processing on the attribute data and the network environment data to obtain structured data; and predicting, based on the structured data, the network status in which the video streaming server downloads the video stream within the preset time period, to obtain the prediction result; and transmit the prediction result to a streaming strategy adjuster, the prediction result being configured for instructing the streaming strategy adjuster to determine a streaming strategy for the video streaming server to transmit or receive streaming video over a network.

7. The apparatus according to claim 6, wherein the performing structured processing on the attribute data and the network environment data to obtain structured data comprises:

creating first time series data based on timestamp information of the attribute data, and creating second time series data based on timestamp information of the network environment data; and performing structured processing on the first time series data and the second time series data to obtain the structured data.

8. The apparatus according to claim 7, wherein the attribute data comprises a plurality of types of first data, and the creating first time series data based on timestamp information of the attribute data comprises:

obtaining timestamp information corresponding to the plurality of types of first data; and creating, for the plurality of types, based on the timestamp information corresponding to the plurality of types of first data, first time series data corresponding to the plurality of types; and the network environment data comprises a plurality of types of second data, and the creating second time series data based on timestamp information of the network environment data comprises:

obtaining timestamp information corresponding to the plurality of types of second data; and creating, for the plurality of types, based on the timestamp information corresponding to the plurality of types of second data, second time series data corresponding to the plurality of types.

9. The apparatus according to claim 7, wherein the performing structured processing on the first time series data and the second time series data to obtain the structured data comprises:

preprocessing the first time series data and the second time series data to obtain preprocessed first time series data and preprocessed second time series data, the preprocessing comprising at least one of abnormal data removal processing and duplicate data removal processing; and performing structured processing on the preprocessed first time series data and the preprocessed second time series data based on a preset structure network, to obtain the structured data.

10. The apparatus according to claim 6, wherein the predicting, based on the structured data, the network status in which the video streaming server downloads the video stream within the preset time period, to obtain the prediction result comprises:

predicting, based on the structured data in a direction of a plurality of types of network indicators, the network status in which the video streaming server downloads the video stream within the preset time period, to obtain prediction results corresponding to the plurality of types of network indicators.

11. A non-transitory computer-readable medium storing computer-readable instructions that, when executed by a processor, cause a video streaming control apparatus to:

obtain attribute data and network environment data of a process in which a video streaming server is downloading or downloaded a video stream, the attribute data representing a download status of the video stream during the process;

predict, based on the attribute data and the network environment data, a network status in which the video streaming server downloads the video stream within a preset time period, to obtain a prediction result, the preset time period corresponding to a future time period, the predicting comprising:

performing, by the computing device, structured processing on the attribute data and the network environment data to obtain structured data; and predicting, based on the structured data, the network status in which the video streaming server downloads the video stream within the preset time period, to obtain the prediction result; and transmit the prediction result to a streaming strategy adjuster, the prediction result being configured for instructing the streaming strategy adjuster to determine a streaming strategy for the video streaming server to transmit or receive streaming video over a network.

12. The non-transitory computer-readable medium according to claim 11, wherein the performing structured processing on the attribute data and the network environment data to obtain structured data comprises:

creating first time series data based on timestamp information of the attribute data, and creating second time series data based on timestamp information of the network environment data; and performing structured processing on the first time series data and the second time series data to obtain the structured data.

13. The non-transitory computer-readable medium according to claim 12, wherein the attribute data comprises a plurality of types of first data, and the creating first time series data based on timestamp information of the attribute data comprises:

obtaining timestamp information corresponding to the plurality of types of first data; and creating, for the plurality of types, based on the timestamp information corresponding to the plurality of types of first data, first time series data corresponding to the plurality of types; and the network environment data comprises a plurality of types of second data, and the creating second time series data based on timestamp information of the network environment data comprises:

obtaining timestamp information corresponding to the plurality of types of second data; and creating, for the plurality of types, based on the timestamp information corresponding to the plurality of types of second data, second time series data corresponding to the plurality of types.

14. The non-transitory computer-readable medium according to claim 12, wherein the performing structured processing on the first time series data and the second time series data to obtain the structured data comprises:

preprocessing the first time series data and the second time series data to obtain preprocessed first time series data and preprocessed second time series data, the preprocessing comprising at least one of abnormal data removal processing and duplicate data removal processing; and performing structured processing on the preprocessed first time series data and the preprocessed second time series data based on a preset structure network, to obtain the structured data.

15. The non-transitory computer-readable medium according to claim 11, wherein the predicting, based on the structured data, the network status in which the video streaming server downloads the video stream within the preset time period, to obtain the prediction result comprises:

predicting, based on the structured data in a direction of a plurality of types of network indicators, the network status in which the video streaming server downloads the video stream within the preset time period, to obtain prediction results corresponding to the plurality of types of network indicators.

* * * * *